US008517583B2

(12) United States Patent
Wesson

(10) Patent No.: US 8,517,583 B2
(45) Date of Patent: *Aug. 27, 2013

(54) LOADED LED BULBS FOR INCANDESCENT/FLUORESCENT/NEON/XENON/HALOGEN BULBS REPLACEMENT IN LOAD SENSITIVE APPLICATIONS AND MORE

(75) Inventor: Bruce Wesson, Newton, MS (US)

(73) Assignee: Jam Strait, Inc., Newton, MS (US)

( * ) Notice: Subject to any disclaimer, the term of this patent is extended or adjusted under 35 U.S.C. 154(b) by 374 days.

This patent is subject to a terminal disclaimer.

(21) Appl. No.: 12/589,539

(22) Filed: Jul. 24, 2009

(65) Prior Publication Data

US 2011/0018436 A1 Jan. 27, 2011

(51) Int. Cl.
*B60Q 1/44* (2006.01)

(52) U.S. Cl.
USPC ............................ 362/547; 362/541; 362/545

(58) Field of Classification Search
USPC .................... 362/249.02, 373, 499, 543–545, 362/547, 800, 249.12, 249.13, 227, 264, 362/362, 479, 548
See application file for complete search history.

(56) References Cited

U.S. PATENT DOCUMENTS 4,211,955 A 7/1980 Ray
4,302,801 A * 11/1981 Duddy .......................... 362/345
4,603,278 A 7/1986 Devir et al.
4,727,289 A * 2/1988 Uchida ........................... 315/71
4,733,335 A * 3/1988 Serizawa et al. .............. 362/503
4,808,968 A * 2/1989 Caine ............................ 340/479
5,160,200 A 11/1992 Cheselske
5,160,201 A 11/1992 Wrobel
5,367,444 A * 11/1994 Bornhorst et al. ............ 362/264
5,575,459 A 11/1996 Anderson
5,577,832 A * 11/1996 Lodhie ..................... 362/249.03
5,632,551 A 5/1997 Roney et al.
5,638,045 A * 6/1997 Byrd ............................. 340/479
5,806,965 A 9/1998 Deese
5,874,894 A * 2/1999 Heller ........................... 340/479
5,877,682 A * 3/1999 Groeller ........................ 340/479
5,896,084 A * 4/1999 Weiss et al. ................... 340/468
5,921,660 A 7/1999 Yu
5,939,839 A * 8/1999 Robel et al. ................... 315/289
5,947,588 A 9/1999 Huang
6,045,240 A 4/2000 Hochstein
6,220,722 B1 4/2001 Begemann
6,234,648 B1 5/2001 Borner et al.
6,250,788 B1 * 6/2001 Muller .......................... 362/541
6,371,636 B1 4/2002 Wesson
6,598,996 B1 * 7/2003 Lodhie ..................... 362/249.05
6,786,625 B2 9/2004 Wesson
7,083,305 B2 * 8/2006 Galli ............................. 362/294
7,566,142 B2 7/2009 Wesson
2003/0189828 A1 * 10/2003 Coushaine .................... 362/226
2005/0265039 A1 * 12/2005 Lodhie et al. ................. 362/541

(Continued)

*Primary Examiner* — Y My Quach Lee
(74) *Attorney, Agent, or Firm* — Garvey, Smith, Nehrbass & North, L.L.C.; Seth M. Nehrbass; Mackenzie D. Rodriguez

(57) ABSTRACT

A Light Emitting Diode Lamp Module for specific use in all vehicle tail, brake or turn signal lamp fixtures for integrated single and dual element operation. The module has integrated dual element control circuitry, voltage and current control circuitry, brightness enhancement circuitry, and LED circuitry built into the universal body to produce a bright, reliable, long life, energy efficient LED lamp that fits all vehicles. Preferably, there is a built-in or attached load/resistance to match the impedance/resistance requirements of the application for which the bulb is used.

37 Claims, 38 Drawing Sheets

(56) References Cited

U.S. PATENT DOCUMENTS

| | | | | |
|---|---|---|---|---|
| 2005/0276063 | A1* | 12/2005 | Coushaine et al. | 362/555 |
| 2006/0039159 | A1* | 2/2006 | Grote et al. | 362/548 |
| 2007/0041184 | A1* | 2/2007 | Lavy et al. | 362/216 |
| 2007/0109806 | A1* | 5/2007 | Tsukamoto et al. | 362/545 |
| 2007/0159828 | A1* | 7/2007 | Wang | 362/294 |
| 2008/0225538 | A1* | 9/2008 | Lynam et al. | 362/494 |
| 2009/0046465 | A1* | 2/2009 | Hashimoto et al. | 362/294 |
| 2009/0154159 | A1* | 6/2009 | Graybill et al. | 362/249.02 |
| 2010/0033971 | A1* | 2/2010 | Lu et al. | 362/294 |
| 2010/0254132 | A1* | 10/2010 | Wassel et al. | 362/235 |

* cited by examiner

Detail Hole

Detail Sidehole

Section Channel-Channel

LOADED LED BULBS FOR INCANDESCENT/FLUORESCENT/NEON/XENON/HALOGEN BULBS REPLACEMENT IN LOAD SENSITIVE APPLICATIONS AND MORE

CROSS-REFERENCE TO RELATED APPLICATIONS

Priority of my U.S. Provisional Patent Application Ser. No. 60/135,797, filed 24 May 1999, now expired, is hereby claimed.

Priority of my U.S. Provisional Patent Application Ser. No. 60/345,788, filed 31 Dec. 2001, now expired, is hereby claimed.

Priority of my U.S. Provisional Patent Application Ser. No. 60/346,666, filed 8 Jan. 2002, now expired, is hereby claimed.

Priority of my U.S. Provisional Patent Application Ser. No. 60/431,333, filed 6 Dec. 2002, now expired, is hereby claimed.

Priority of my U.S. Provisional Patent Application Ser. No. 60/370,319, filed 5 Apr. 2002, now expired, is hereby claimed.

Priority of my U.S. Provisional Patent Application Ser. No. 60/544,409, filed 13 Feb. 2004, now expired, is hereby claimed.

Priority of my U.S. Provisional Patent Application Ser. No. 60/717,639, filed 16 Sep. 2005, now expired, is hereby claimed.

This is a continuation-in-part of U.S. patent application Ser. No. 10/730,744, filed 8 Dec. 2003, which is a continuation-in-part of U.S. patent application Ser. No. 10/123,542, filed 16 Apr. 2002, now U.S. Pat. No. 6,786,625, issued 7 Sep. 2004, which is a continuation-in-part of U.S. patent application Ser. No. 09/578,813, filed 24 May 2000, now U.S. Pat. No. 6,371,636, issued 16 Apr. 2002.

This is a continuation-in-part of U.S. patent application Ser. No. 12/047,950, filed 13 Mar. 2008, which is a divisional of Ser. No. 10/408,768, filed 7 Apr. 2003, which is now abandoned.

This is a continuation-in-part of U.S. patent application Ser. No. 11/057,691, filed 14 Feb. 2005.

This is a continuation-in-part of U.S. patent application Ser. No. 11/532,882, filed 18 Sep. 2006, which is a continuation-in-part of U.S. patent application Ser. No. 11/057,691, filed 14 Feb. 2005, which is a continuation-in-part of U.S. patent application Ser. No. 10/730,744, filed 8 Dec. 2003, which is a continuation-in-part of U.S. patent application Ser. No. 10/123,542, filed 16 Apr. 2002, now U.S. Pat. No. 6,786,625, issued 7 Sep. 2004, which is a continuation-in-part of U.S. patent application Ser. No. 09/578,813, filed 24 May 2000, now U.S. Pat. No. 6,371,636, issued 16 Apr. 2002.

All of these applications are incorporated by reference. Also incorporated herein are all US patents and patent applications listing me as an inventor.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates generally to lamps for motor vehicles and more particularly to direct current light-emitting diode (LED) lamps and more particularly to LED lamp modules containing control circuitry for producing light of high intensity usable as a tail, brake, or turn signal lamp.

2. Background

The features of the present invention are particularly useful as applied to the construction of LED lamp modules to replace incandescent lamps used in automobiles and other motor vehicles and are applicable to the manufacture of LED replacement bulbs for both single filament and dual filament incandescent bulbs. LED's typically operate at voltages between 1.7 and 2.2 volts. Overvoltaging and overheating of LED's result in significant degradation of the performance and lifetime of LED's. One well known type of existing incandescent lamp generally employs a type S-8 glass bulb cemented in a double-contact brass bayonet base. A second type of incandescent lamp has a similar bulb inserted into an insulated plastic wedge base that is adapted to fit into a corresponding plastic socket. A type of incandescent bulb with a wedge base is described in U.S. Pat. No. 4,603,278 (Devir et al.). Incandescent vehicle signal-lamp bulbs consume a relatively large amount of power, generate a large amount of heat and have a relatively short life.

LED bulbs designed to replace vehicle incandescent bulbs require bases similar to the standard bayonet or the wedge bases. To be effective an LED bulb must be adapted to produce an intense light when viewed by the human eye and must provide for effective heat dissipation to avoid impairing the LED's. It also must be designed to operate within the range of voltages present in motor vehicles so as to not over-voltage the LED's. Finally, some models of motor vehicles ground the brake circuit when the brake is not activated to prevent any accidental activation of the brake lights; accordingly, an effective LED bulb designed to replace a dual filament bulb must contain circuitry enabling the LED's to be activated with either the tail lamp circuit or the brake light circuit.

One approach to solving the problems of cooling the LED's is given in U.S. Pat. No. 5,632,551 (Roney et al.) which describes an LED bulb as used in truck trailers and/or tractors. The LED's are mounted on a printed circuit board (PCB). The LED's are embedded in resin to facilitate the conduction of heat away from the LED's so that the heat will not cause the LED's to degrade and lose brightness. This bulb is not designed to fit in standard automotive lamp sockets.

A second approach to the cooling problem is given by U.S. Pat. No. 5,575,459 (Anderson) which describes an AC LED bulb that uses air holes to provide air circulation and cooling for an LED bulb. This bulb is not suitable for motor vehicle use.

U.S. Pat. No. 6,045,240 (Hochstein) presents a third solution to the problem of cooling the LED's by teaching the use of a heat sink to cool an LED array. This is not a bulb, but a lamp assembly; therefore it is not suitable for replacing an incandescent light bulb.

One type of LED bulb with a wedge base is described in U.S. Pat. No. 5,160,200 (Cheselske). It provides a parallel string of LED's soldered and rolled up for 2-volt dc operation. The roll is placed in a housing with two leads extending out the wedge type base. No provisions are made for 12-volt operation, dual element operation, voltage control, heat dissipation, or brightness enhancement. The wedge is not suitable for motor vehicle wedge type sockets, because it differs in size and shape from the automotive standard. Additionally, it does not have the required fasteners for motor vehicle applications. It is also limited in the number of LED's which may be contained and therefore the brightness because of the cylindrical shape specified for the body. A funnel shaped body is more desirable for automotive applications. Typical LED's are 1.7 to 2.2 volts dc. If this bulb were connected to vehicle voltage of 12 to 14 volts dc, the LED's will burn out.

U.S. Pat. No. 5,947,588 (Huang) describes an LED bulb where an LED array is mounted on a printed circuit board which is in turn mounted on a standard automotive bayonet type base. The LED's are directly connected to the electrical contacts on the bayonet base. The patent shows an embodiment of the bulb to replace a dual filament bulb. The patent does not describe the circuit connections of the LED's to the contacts, but either the LED's are grouped into two sets-one for use as tail lights and a second for use as brake lights—or the LED's are connected in parallel so that all LED's are illuminated when either the tail light or the brake light circuit is energized. If the LED's are grouped in the two sets then all of the LED's cannot be energized at once resulting in dimmer tail light and brake lights. On the other hand, if the circuits are connected in parallel so that all LED's would be energized if either tail lamp or brake lamp circuit were energized, the array would not work as tail lamps in automobiles in which the brake lamp is grounded when the brake is not activated. Also, if this configuration did work in some vehicles, the tail lamps and the brake lamps would be illuminated with equal intensity, that is the brake lights would not be brighter. The patent discusses the problem of low intensity by suggesting the addition of more LED's; this would make the array larger than a standard incandescent lamp which in turn would result in the LED lamp being unable to fit into many tail lamp assemblies. Also, this configuration of LED bulb will not fit into many recessed automotive sockets and lamp assemblies.

Voltage varies from vehicle to vehicle from a low of 10-volts to high of 14.5 volts. In the LED bulb of U.S. Pat. No. 5,947,588, the LED's will dim in low voltage situations or worse, burn out in over voltage situations, both of which are undesirable. No means is provided for controlling the voltage and current. This lack of control causes the brightness to vary according to the vehicle voltage. It is well known that most vehicles' batteries are 12-volts dc when fully charged. They are less than 12 volts when undercharged. Most vehicles charging systems produce in excess of 12-volts dc and typically between 13 and 14 volts. With applied voltage spread evenly divided across a plurality of LED's in the instant bulb without control circuitry there will be a very noticeable difference in brightness at low voltage situations and in over voltage condition on the LED's at the higher voltage extreme. Whereas incandescent bulbs are not susceptible to damage due to the over voltage situations nor do they dim down excessively at under voltage conditions, LED's by nature lose brightness disproportionately to the reduced voltage when operated below their typical specified operating voltage. On the other hand, LED's can only handle their specified maximum voltage without degradation or failure.

It is desirable to produce a light bulb that has a plurality of light-emitting diodes (LED's) which can be illuminated all at once and in a controlled way so as to have a different brightness for brake and tail light applications connected to a conventional bayonet or plastic wedge-type base so as to replace conventional single or dual filament incandescent bulbs. Neither U.S. Pat. No. 5,160,200 (Cheselske) nor U.S. Pat. No. 5,947,588 (Huang) provide a way of controlling the brightness of the LED array in different applications.

SUMMARY OF THE INVENTION

It is an object of the present invention to provide an LED replacement bulb for incandescent light bulbs, which is adapted for use in all standard vehicle sockets.

It is further an object of the present invention to provide an LED replacement bulb for incandescent light bulbs, which will protect the LED's from degradation due to overheating.

It is further an object of the present invention to provide an LED replacement bulb for incandescent light bulbs, which will protect the LED's from degradation due to overvoltage or excess current.

It is still further an object of the present invention to provide an LED replacement bulb for incandescent light bulbs, which will give greater brightness as sensed by the human eye.

It is further an object of the present invention to provide an LED replacement bulb for incandescent light bulbs with integrated dual element control of the entire plurality of LED's.

It is further an object of the present invention to provide an LED replacement bulb for incandescent light bulbs with integrated dual element control of the entire plurality of LED's.

It is further an object of the present invention to provide an LED replacement bulb for incandescent light bulbs with a means for pulsating the LED array so as to increase brightness output, reliability, and life expectancy while reducing energy consumption, heat, and resulting degradation of the LED's.

It is further an object of the present invention to provide an LED replacement bulb for incandescent light bulbs that has no ramp-up time for light intensity as the incandescent bulbs have.

It is still further an object of the invention to provide a bulb to employ a standard bayonet and wedge base for easy and cost effective production.

These and other objects, advantages, and features are attained, in accordance with the principles of this invention by an LED array connected to control circuitry. In one embodiment, a replacement for a dual filament bulb, the problem of controlling the intensity of the light emitted by the array is solved by having a first resistor in series with the array connected to the tail light connection on the bulb base. This controls the intensity and prevents overvoltaging and overheating by controlling the voltage and current to the array. A second resistor and a diode are connected in series with the array to the brake light connection on the bulb base. The diode prevents the array from being grounded when the brake light connection is grounded in some vehicles, while the second resistor provides for a higher voltage and current to be applied to the LED array resulting in greater intensity of the emitted light.

Another embodiment solves the problems of controlling the brightness of the LED array by energizing the LED's with a series of pulses of higher voltage but short duration. For a pulse frequency of 50 Hz or greater the human eye, due to persistence of the image, will see the pulse as a constant intense light. The individual pulses of light have much higher intensity than when a constant voltage is applied to the LED array. However, since the pulses are of very short duration, the total power consumption is less than with a constant voltage solving the problem of overheating the LED's. The pulse circuitry also prevents the degradation of the LED's due to over-voltage by controlling the duty cycle appropriately.

In order to provide a universal replacement for incandescent vehicle bulbs they are packaged in a configuration that mimics the size and shape of the original bulb. Other provisions in the design provide for cooling of electronics and use with a standard bayonet or wedge base as are found on bulbs.

The present invention is a unique light emitting diode vehicle lamp module adapted for mounting in standard vehicle brake/tail lamps or turn signal assemblies to replace standard vehicle incandescent bulbs. The invention features universal vehicle fit, integrated dual element control, voltage and current regulation, brightness, enhancement circuitry, improved energy efficiency, and longer life expectancy. It features a base adapted to fit a standard vehicle lamp assembly and further adapted to make electrical connection with the brake/tail lamps or turn signal assembly, circuitry electrically connected to the base to control and enhance brightness a plurality of light emitting diodes, a light emitting diode cluster mounted on a printed circuit card or otherwise electrically connected and mounted in a wedge or bayonet base which encases the control and brightness circuitry so the light emitting diodes illuminate when an electrical signal is applied to the motor vehicle lamp assembly and where the light emitting diode cluster is aligned to shine directly through the lens of the tail lamp or turn signal assembly. The present invention differs from the prior art in that all LED's are illuminated for both tail and brake light circuits, but with different controlled light intensities.

Load balanced bulbs and lamps and modules for use in automotive, commercial, industrial, military and residential applications: Some applications such as vehicles, commercial, industrial, military, and residential controls and instrumentation and equipment and systems sense and/or detect the load or current or voltage of bulbs and lamps for various reasons such as feedback, lock out, fail safe, safety and indication. The reasons are limitless.

Some vehicles disable function of cruise controls, provide "blown bulb" indication, hyper flash the turn signals, and prevent transmissions from shifting normally for examples.

Some fire protection systems in commercial, industrial, and military applications detect each exit sign which is lit and feed back information to the control panel for indication, alarm and processing. Some lighting systems in commercial, industrial, military, and residential applications provide detection, feedback, indication, alarm and/or processing of light on/off status.

New technology bulbs and lamps such as Light Emitting Diode (LED), Xenon, Argon, Halogen, High Intensity Discharge (HID), neon, photon, liquid display, plasma, and numerous others with different loads pose many load and impedance matching problems when being used to replace bulbs of different loads in load sensitive applications.

Prior art proposed solutions include modification of the various systems to eliminate or bypass or substitute the need for sensing or detecting the load or current or voltage of the bulb such as replacing turn signal flashers on vehicles with blown bulb detection with a variable or no load flashers is one example. This is rarely available due to number of different models required and availability and cost of replacement. For commercial, industrial, residential, and military applications, disabling functions on lighting or fire control systems by reprogramming, deselecting, or jumping out function will clear the alarm indication but eliminates the benefits of the functions.

Installation of a resistor across a bulb or lamp is another example of a prior art method in vehicles, commercial, industrial, military and residential applications. Problems with the resistor method in vehicles are the cost, vehicle modifications, trouble, time, installation problems, testing requirements, procurement hassles, and so on.

The present inventions provide means of resolving the load and impedance matching problems by adding the required load back into the bulbs and circuits that avoids the problems associated with the prior art. The inventions are new technology replacement bulbs and lamps that have built within them, or modules to attach to them or the circuit, additional load that when added to the load of the particular bulb or lamp, would increase the total bulb or lamp load to an amount that would effectively simulate the effectual impedance or load of the original bulb or lamp so that the load sensitive circuit or system or equipment or vehicle or controller or computer or grid or assembly functions normally and/or as intended or desired.

The present inventions are available in a multitude of embodiments required or desired to accommodate the vast number of applications. Changes to shape, size, look, material, strength, configuration, ways and means are deemed to be within the scope of this invention and is believed that anyone skilled in the art could make various changes and still get the same results. The following disclosed embodiments are but a sample of just a few of many possible embodiments that are included in this invention.

The present invention includes automotive bulbs and lamps with load and impedance matching resistance or impedance built in.

The present invention includes load and impedance matching modules that connects to automotive circuits or bulbs or lamps.

The present invention includes commercial bulbs and lamps with load and impedance matching resistance or impedance built in.

The present invention includes load and impedance matching modules that connects commercial circuits or bulbs or lamps.

The present invention includes industrial bulbs and lamps with load and impedance matching resistance or impedance built in.

The present invention includes load and impedance matching modules that connects to industrial circuits or bulbs or lamps.

The present invention includes military bulbs and lamps with load and impedance matching resistance or impedance built in.

The present invention includes load and impedance matching modules that connects to military circuits or bulbs or lamps.

The present invention includes residential bulbs and lamps with load and impedance matching resistance or impedance built in.

The present invention includes load and impedance matching modules that connects to residential circuits or bulbs or lamps.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DESCRIPTION OF THE PREFERRED EMBODIMENTS

Although specific embodiments of the present invention will now be described with reference to the drawings, it should be understood that such embodiments are by way of example only, and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
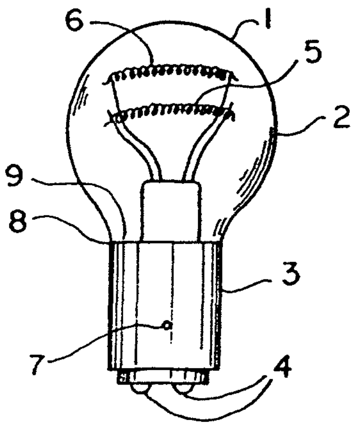
PRIOR ART FIG. 1
FIG. 1 is a perspective view of a bayonet base electric incandescent lamp typically used in vehicles.

In order to understand the preferred embodiments an examination of some prior art is useful. FIG. 1 illustrates a standard incandescent type automotive bulb 10 with a bayonet base that has been used for many years. The incandescent bulb comprises a glass envelope 1, of standard one-inch width at its widest point 2, attached to a standard electrically conducting base 3. The base has electrical contacts 4, which are electrically connected to a tungsten brake filament 5 and a tungsten tail filament 6 respectively which are in turn grounded through the electrically conducting base 3. Except for ground, the filaments are electrically isolated, as are the power inputs to the bulb. The brake lamp filament is brighter and draws more electrical current than does the tail lamp filament. The base has a plurality of index pins 7 for aligning and securing the bulb into a bayonet type socket. The angle 8 between the standard base and the glass envelope is typically about 150 degrees to enable the bulb to fit into a standard lamp socket. The widest point 2 of the envelope 1 is approximately 0.7 inches above the top 9 of the base.

Figure 2:
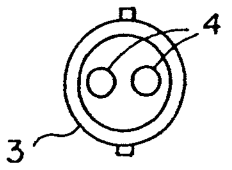
PRIOR ART FIG. 2
FIG. 2 is bottom view of a standard dual element, bayonet base bulb.

FIG. 2 is bottom view of the dual filament bulb of FIG. 1 with brake and tail electrical connections 4.

Figure 3:
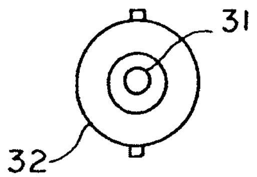
PRIOR ART FIG. 3
FIG. 3 is bottom view of a standard single element, bayonet base bulb.

FIG. 3 is a bottom view of a single filament bulb similar to the bulb of FIG. 1, with a single electrical connection 31.

Incandescent lamps all have inherent problems or limitations due to the nature of their operation. The tungsten filaments 5 and 6 shown in FIG. 1 for incandescent bulbs typically burn out after approximately 2,000 hours of usage. Because of this, they are relatively unreliable by today's solid state standards. It takes time, effort, and money to replace the blown bulbs. If not replaced, blown bulbs can impair the safe operation of vehicle. Additionally, the bulbs consume a great deal of electric energy and generate a lot of heat. LED bulbs are more energy efficient and generate much less heat.

The filaments operate in an inert gas in the glass envelope. When the contacts 4 are connected to power, electricity flows through the filaments causing them to heat up and glow brightly. The glow is not instantaneous, but it takes time for the filaments to heat up.

The filaments in dual element incandescent vehicle brake/tail lamps are electrically insulated from each other. The circuit for each filament is typically separately wired, fused and grounded. In many vehicles, the brake signal is taken to ground when inactive for safety reasons which is a problem for prior art LED bulbs.

Figure 4:
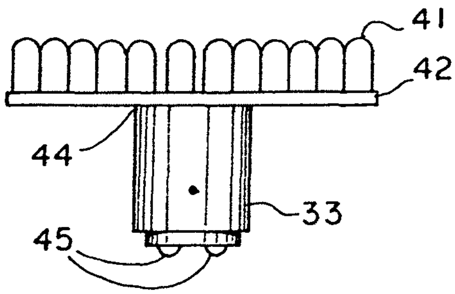
PRIOR ART FIG. 4
FIG. 4 is a perspective view of a prior art LED lamp for automotive use in bayonet base type sockets.

FIG. 4 depicts a prior art LED replacement bulb of U.S. Pat. No. 5,947,588 (Huang). As described, electrical contacts 45 connect by means of wires or other conventional means directly to the LED's 41 mounted upon printed circuit board (PCB) 42. Although not explained in the patent, the only way to provide for dual element operation in FIG. 4 is to either split the plurality of LED's between taillight and brake light thus limiting the brightness of each or to run both circuits in parallel. If wired together in parallel the LED's will be equally bright for tail as it is for brake providing no distinction between the two. This does not conform to normal standards for vehicle operation. Adding additional light emitting diodes to LED's 41 will only limit the applications it will fit due to size restrictions of the width of the bulb, in this case the PCB 42. Using smaller LED's such as size T1 or SMT in larger quantity within the same space will not improve the situation because the maximum rated brightness of these is less.

The FIG. 4 bulb will fit in applications where the described hollow lens can be removed to replace the bulb and where there is adequate space provided at the top of the metal cylindrical bulb base 44 for a large enough group of LED's 41 for adequate brightness for vehicle applications, such as in motorcycles, older automobiles and boat trailers. However, there are many other applications where this bulb will not fit and still effectively operate due to space restrictions resulting from the provided connection of the LED PCB 42 directly to the metal cylindrical bulb base 44.

Figure 5:
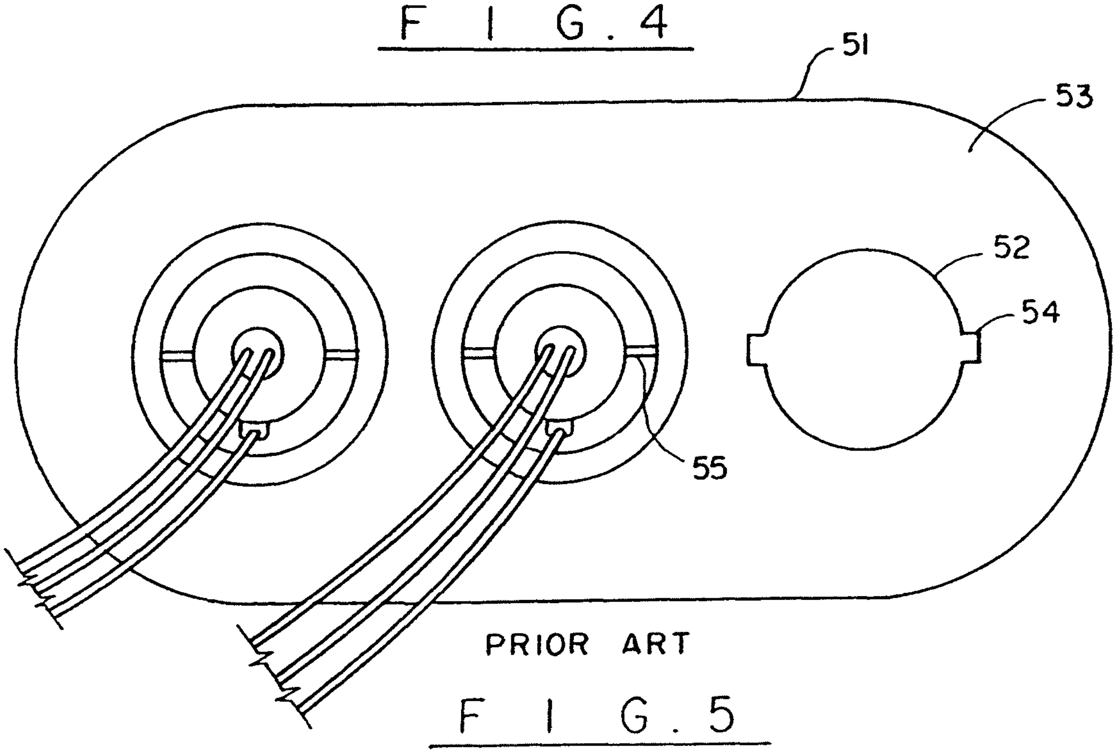
PRIOR ART FIG. 5
FIG. 5 is view of a typical trunk accessible vehicle brake/tail/turn lamp assembly from inside of trunk facing the rear of the vehicle.
Figure 6:
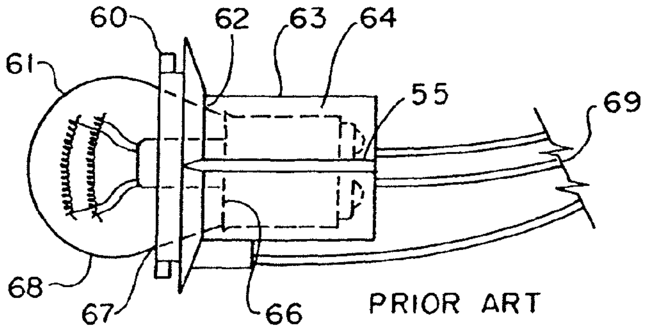
FIG. 6 is a side view of a typical trunk mounted recessed bulb socket showing a standard incandescent bulb installed.

Referring now to FIG. 5 and FIG. 6, most newer vehicles brake, tail, and turn signal bulbs are installed from within the trunk per FIG. 5. In these applications, the lamp assemblies 51 provide for bulb installation through one-inch diameter holes 52 in the reflectors 53 with slots 54 for the ¼ turn locking tabs 60 found on recessed bulb socket 63. The reflectors 53 are sealed to the opposite amber or red lenses.

The recessed bulb sockets of FIG. 6 are inserted into hole 52 of the lamp assemblies. The sockets contain an incandescent lamp where a portion 62 of the glass envelope 61 is in the recessed bulb socket 63. The bayonet base 64 is completely submerged in the socket along with part of the length of the glass envelope 61. The wings 55 on the socket enable easy ¼ turn installation into the assembly 51. The available side clearance around the top of the base 66 in these applications is nearly zero. Significant bulb clearance is provided outside the neck 67 of the socket; of which the widest point 68 of the envelope is approximately up to 0.7 inches out from the top of the base 66, counting the extra distance required for depressing for installation and de-installation. In these applications, the base 43 of the prior art of FIG. 4 would not reach the contacts because the bulb width determined by PCB 42 being at the top of the base 44 would block installation unless the diameter of PCB 42 is equal to or less than the top of the base 44. If that were so, it would be swallowed up as the base 64 shows and it would be virtually impossible to remove it without a special made tool. It would also be restricted in number of LED's 41 in FIG. 4 to provide adequate light intensity.

Figure 7:
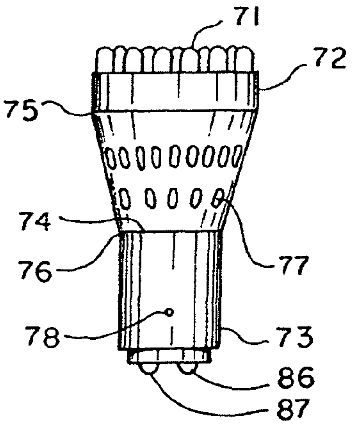
FIG. 7 is a perspective view of a first embodiment of the present invention showing an LED bulb which will fit into all standard automotive lamp sockets.
Figure 8:
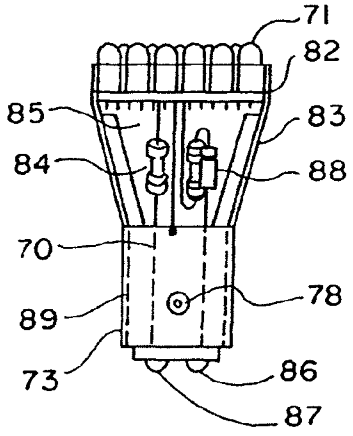
FIG. 8 is a view of the first embodiment, partially in section, showing control circuitry suspended in the body of the LED bulb.

The first preferred embodiment illustrated in FIG. 7 and FIG. 8 provides for a light emitting diode vehicle lamp module with integrated dual element control, voltage and current control, and means for heat dissipation. It is universally adapted for mounting in standard vehicle brake, tail, or turn lamp assemblies to replace the incandescent brake/tail/turn lamp bulb.

The first embodiment comprises a standard metal bayonet base 73 adapted to fit standard vehicle recessed bayonet lamp socket as in FIG. 6. Body 72 replicates the geometry of the incandescent bulb FIG. 1 so as to fit into a recessed lamp socket of FIG. 6. The body contains body cavity 85 and is funnel shaped with the small end 89 fitting down into opening 70 in base 73. From the top 74 of the base 73, the body tapers outward as it extends a length of 0.7 inches reaching a maximum diameter of approximately one inch, where the body has a constant diameter and extends about 0.2 inches to encase a plurality of LED's 71 in the large end 75. The angle 76 of the body taper with respect to the base 73 is essentially the same as the angle 8 of the incandescent bulb in FIG. 1. This design of the body allows installation in all vehicle brake/tail/turn applications including recessed ones such as FIGS. 5 and 6 where prior art FIG. 4 will not fit.

Base 73 is adapted to make electrical connection via contacts 86 and 87 with the brake, tail, or turn lamp assembly with dual element control circuitry 84 connected to the contacts and to a plurality of LED's 71 so as to electrically control the diodes. The LED's 71 are mounted on a printed circuit board 82, which is electrically connected to the control circuitry. The LED's 71 are mounted in body 72 so the light emitting diodes 71 illuminate when an electrical signal is applied to the motor vehicle lamp assembly.

The dual element control circuitry 84 provides for the cooperation of the entire plurality of LED's 71 for integrated simultaneous tail and brake indication where brake produces near full brightness, tail produces about half brightness and both together produce 100% full brightness. The dual element control circuitry 84 also provides for proper operation of tail by a blocking diode 88 such as 1N4005 when the vehicle's brake input signal is taken to ground as described previously.

Voltage and current are controlled with circuitry 84 to provide a relatively constant voltage and current to each LED to maintain reliability, prevent degradation, and maintain brightness during vehicle voltage swings of 10-14.5 volts dc.

Heat dissipation is required to maintain brightness of the LED's over time. The first embodiment shown in FIG. 8 accomplishes this by locating the heat producing control circuitry 84 away from the LED's 81 by suspending them in open air in the body cavity 85 of the body 83 with ventilation holes 77 for maximum convection air cooling.

Figure 9:
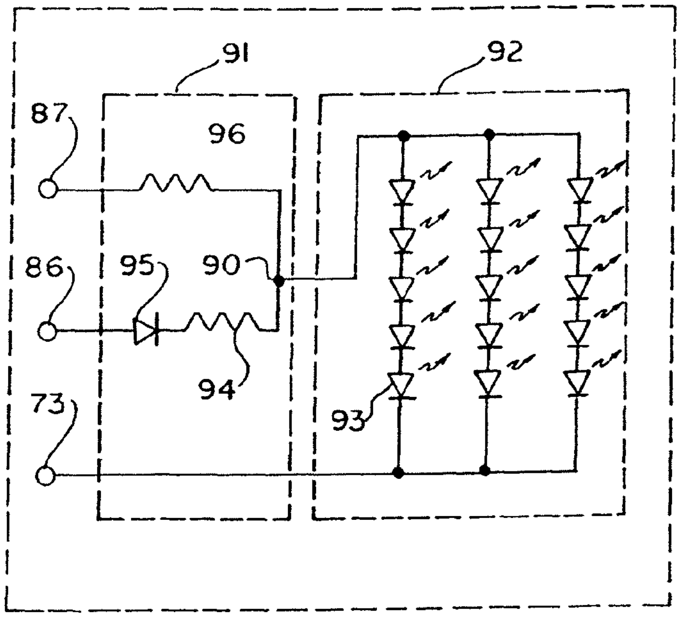
FIG. 9 is a schematic diagram of the control circuitry and LED array.

Referring now to FIG. 9, wherein the control circuitry of FIG. 8 is set out in detail, the plurality of LED's 71 are wired together in parallel series strings in LED circuit 92 especially to consume most of the applied voltage to minimize total heat loss and maximize energy efficiency while allowing enough voltage to drop across the control circuitry 91 to enable effective voltage and current regulation of each LED 93. Contact 87 is for tail lamp input. Specific series power resistor 96 consumes the remaining voltage and limits the current to the LED circuit 92 for the correct tail lamp brightness. Terminal 86 is the contact for brake lamp input. It has a series diode 95 and specific series power resistor 94. The diode 95 blocks the tail voltage at contact 87 from going to ground when brake lamp is off and tail lamp is on in certain vehicles. The series power resistor 94 consumes the remaining voltage not consumed by the diode 95 and the LED circuit 92 and regulates the voltage and current to each specific LED 93. The brake/turn and tail lamp signals are connected at 90 between the control circuit 91 and LED circuit 92. The return side of the LED circuit 92 is connected to the metal standard base 73 that is connected to vehicle ground in the socket 63 via wires 69 (FIG. 6) completing the circuit.

The entire plurality of LED's 92 shine at near full brightness for Brake/Turn with 12 volts at contact 86 and significantly less brightness for tail with voltage at 87. If both brake/turn 86 and tail signals 87 are provided simultaneously the control circuit will allow total brightness of the plurality of LED's 92 to be full brightness. Specific design values for circuitry and LED's provide minimal brake intensity increase and decrease when tail is switched on and off. Determining such would be obvious to one skilled in the art.

Disconnecting of resistor 96 from contact 87 will allow the circuit to function for single element for tail lamp use. The tail lamp signal is input at contact 87. In the wedge based embodiments the inner two-wire conductors are removed to convert to single element use.

The bulb shown in FIGS. 7-9 (or one very similar to it) is commercially available from Jam Strait, Inc. as the following product numbers: 1157-SRL/SA/HR/HA/HG/HB/SW, and replacement specifications can be viewed at www.jamstrait-.com.

Figure 10:
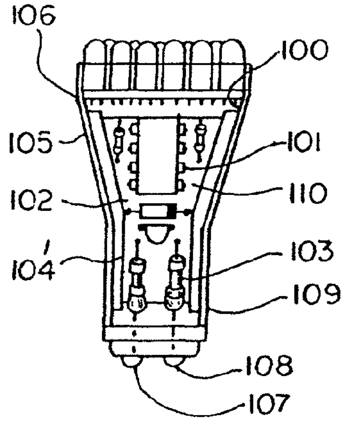
FIG. 10 is a view, partially in section, of a second embodiment showing PCB mounted control and pulse circuitry.
Figure 11:
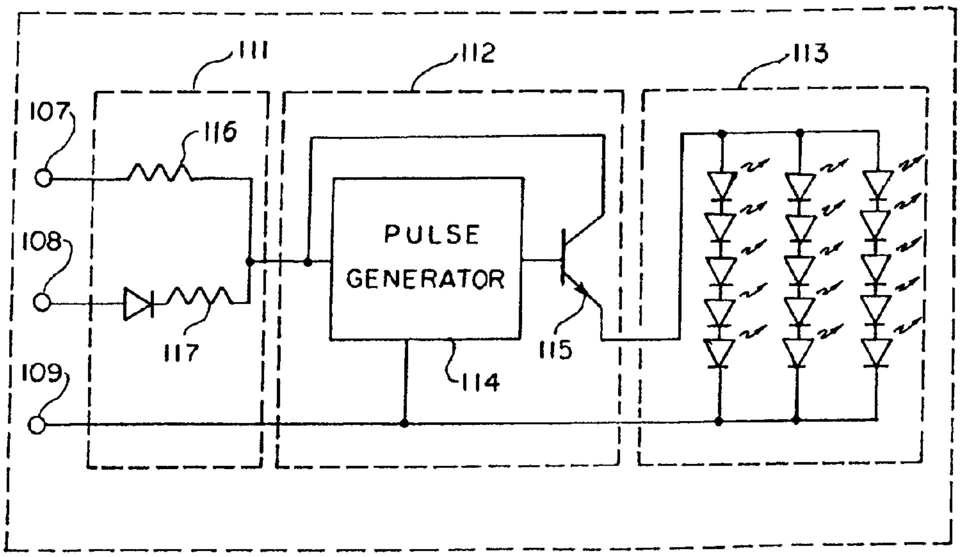
FIG. 11 is a schematic diagram of the control circuitry, pulse circuitry, and LED array contained within the bulb of FIG. 10.
Figure 12:
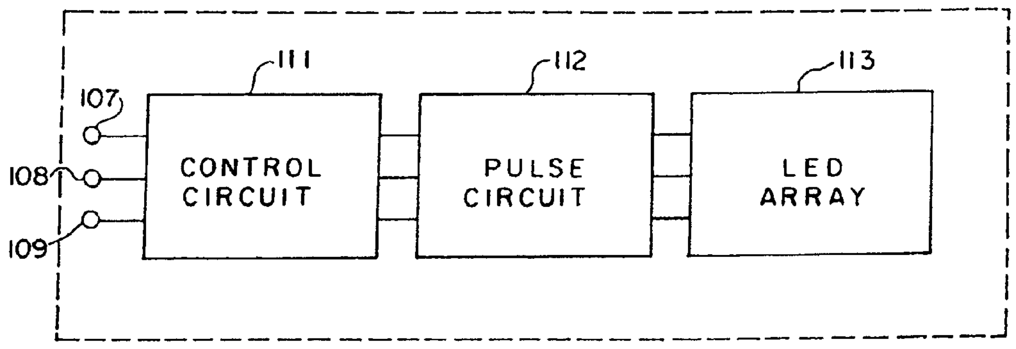
FIG. 12 is a block diagram of the electronic control circuitry, pulse circuitry, and LED array of the second embodiment.
Figure 13:
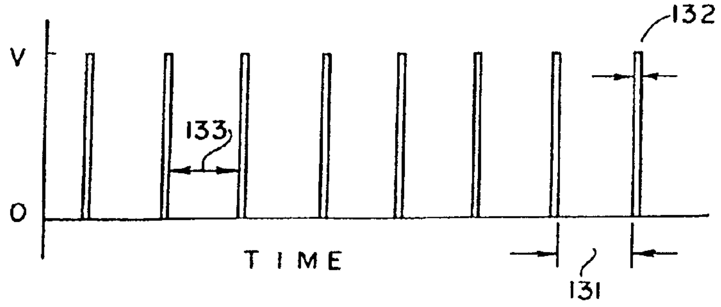
FIG. 13 is graph of the pulsed voltage.

FIG. 10 is a sectional side view of second preferred embodiment. It is identical in shape, fit and operation to FIGS. 7, 8, and 9 except it has brightness enhancement circuitry 101 in the body cavity 110 that is mounted on an internal perpendicular circuit card 102 along with the previously described control circuitry 103. The internal circuit card is fitted into vertical slots 104 along the inside wall 100 of the body 105 aligning it for proper connection to the LED circuit card 106 and the brake 108 and tail 107 input connectors on the standard metal bayonet base 109. Referring now to FIG. 11, the input and control circuit 111 is identical to control circuit 91 of FIG. 9 and the LED circuit 113 of FIG. 11 is identical to LED circuit 92 in FIG. 9. The brightness enhancement circuit 112 is electrically connected between control circuit 111 and LED circuit 113. The block diagram of FIG. 12 illustrates the connection between the various elements where control circuit 111 is electrically connected to pulse, or brightness enhancement, circuit 112 which sends controlled pulses of current to the LED array in LED circuit 113 causing the LED array to emit bright pulses of light at a preset frequency. Pulse generator 114 produces a low current pulsating dc voltage signal to the base of the switching transistor 115. The transistor turns on and off with the input signal producing a voltage to the LED's in LED circuit 113 (FIG. 13). The frequency of the pulse 132 is at a high enough rate to provide visual persistence and is seen by the human eye as a steady light. This is typically 50 cycles or pulses per second or higher. The duty cycle or voltage pulse width of pulse 132 is adjusted to provide maximum LED current and brightness for a duration each cycle that will not damage the LED's in LED circuit 113. Constant higher current would cause the LED's in LED circuit 113 to degrade over time and significantly lose brightness but the pulse current will not. The higher pulse current rate can be set at a multiple of the normal current rating of the LED's in LED circuit 113. Therefore, the intensity of the light flashes is much brighter than the normal light intensity, but because of the short duration of the pulse width of pulse 132 versus the in between off time 133, the high current flow is not damaging to the LED's. Typically the current through the LED's in LED circuit 113 is at a much higher rate than the rated maximum value for the LED's. But because it is pulsed and not constant, the LED's will not heat up and degrade if the ratio of on time of pulse 132 to off time 133 is set properly with the values of the current control resistors 116 and 117. The pulsing technology not only allows for brighter than normal operation of the LED's. It also provides for longer life and reliability as the on time is significantly reduced and the total current and heat are reduced.

Figure 14:
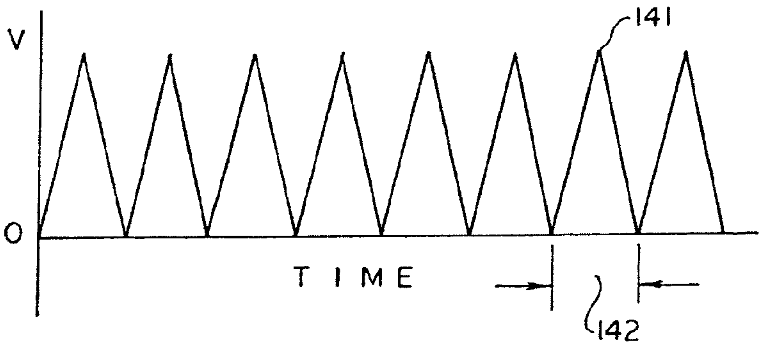
FIG. 14 is a graph of an optional saw-tooth waveform.

An alternate saw-tooth pulsating dc signal is shown in FIG. 14. In this case the voltage and current to the LED circuit 113 are ramped up and down with a predetermined period 142 to provide visual persistency and brighter light than constant dc current allows. Maximum current flows at the time of maximum voltage 141 that exceeds the dc current rating of the LED's. This current value is set in the control circuit 111 to work in cooperation with the pulse circuit to provide maximum brightness without damaging the LED's.

Figure 15:
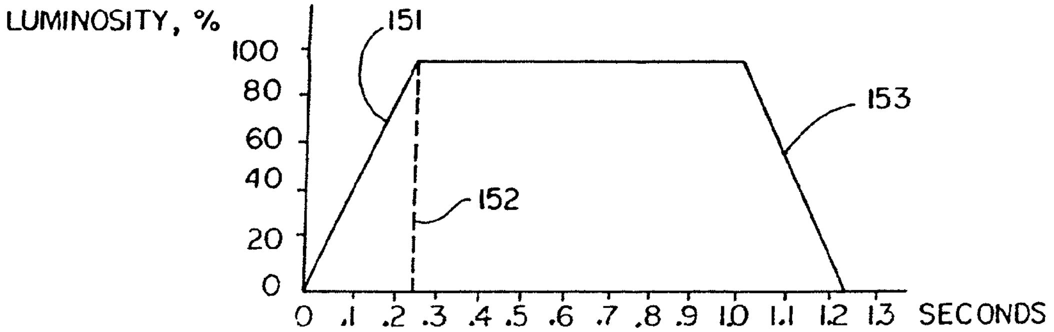
FIG. 15 is a graph of luminosity over time of a standard automotive incandescent brake/tail/turn lamp.

Referring to FIG. 15, it takes time 151 for an incandescent vehicle bulb to heat up and conversely it takes time 153 to cool back down when power is removed. The brightness ramps up to full in about 250 milliseconds (marked at 152 in FIG. 15). So, when a motorist depresses the brake on a vehicle there is a time delay for incandescent brake lamps to glow brightly and alert the following vehicles to the braking condition.

Figure 16:
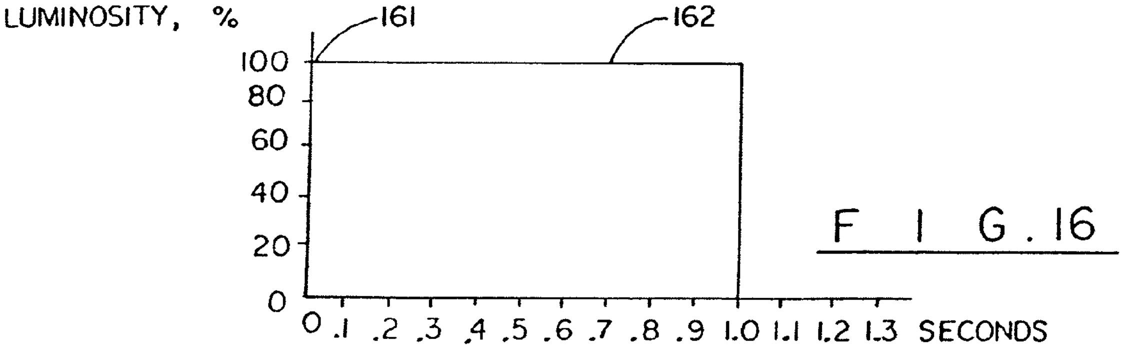
FIG. 16 is a graph of luminosity over time of the present invention.

A graph of the luminosity over time of all of the contained preferred embodiments is shown in FIG. 16 where the LED's are at full brightness at time zero 161 and produces effects of constant light 162 even with the pulsed voltage in FIGS. 13 and 14. Notably the on time is 250 milliseconds faster than the incandescent bulb (see the graph of FIG. 15) described earlier giving motorists advanced warning of braking conditions with respect to prior art. The quicker on time is more eye catching than the standard incandescent bulb of FIGS. 1 and 19.

Figure 17:
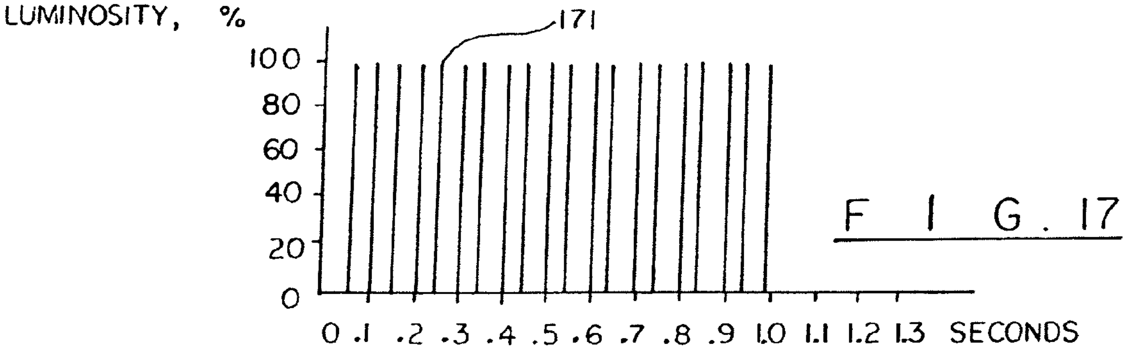
FIG. 17 is a graph of luminosity over time of the present invention with the pulse frequency set for visual strobe effect.

The same second preferred embodiment produces visual light strobes shown in FIG. 17 by slowing the frequency 131 below 50 cycles per second. With the frequency set at 20 cycles per second as graphed in FIG. 17, the LED's will flash 20 times per second. At that rate, the lights will flash 5 times in the same 250 milliseconds (marked at 171 in FIG. 17) it takes an incandescent bulb to ramp-up to full brightness 152 giving advanced warning to motorists of a braking condition. The strobe is more eye catching than steady state incandescent or prior art LED bulbs.

Figure 18:
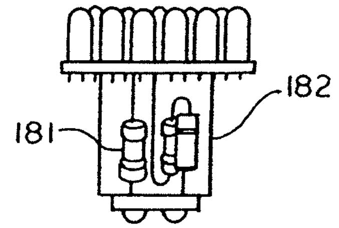
FIG. 18 is a side view partially in section of a third embodiment having suspended control circuitry without a universal fit body.

A side sectional view of the third preferred embodiment is shown in FIG. 18. It is identical in operation, as the first preferred embodiment illustrated in FIGS. 7 and 8 with the only difference being the absence of the universal vehicle fit body 72. This third embodiment has the control circuit 181 suspended within body cavity 183 of standard metal bayonet base 182. Its operation differs from that of the prior art in that all LED's illuminate when used in either the tail lamp mode or the brake lamp mode, and, through the use of control circuitry, brake lamp intensity is greater than tail lamp intensity.

Figure 19:
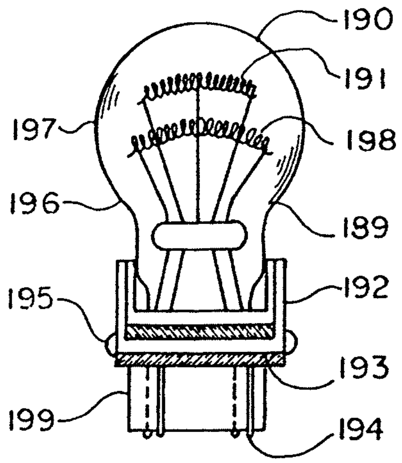
PRIOR ART FIG. 19
FIG. 19 is a perspective view of a standard wedge base electric incandescent lamp typically used in vehicles.

Recently wedge-based electric incandescent lamps similar to that depicted in FIG. 19 have been used on vehicles. Its functions are identical to that in FIG. 1. The only difference is in the physical shape. It has a glass envelope 190 that encases the tungsten tail lamp element 191 and brake element 198. The glass envelope diameter is about one inch at its widest point 197 at a location about 0.7 to 0.8 inch up from the top of the plastic base or clip 192. The narrow end of the glass envelope fits down into the base or clip. The glass envelope tapers out from the top of the base or clip 189 at an angle of about 22 degrees. At point 196 about 0.35 inch out the glass envelope diameter equals the width of the top of the base or clip and continues on to maximum diameter of one inch at 197 about 0.7 to 0.8 inch. Vehicle lamp sockets are designed to accommodate the dimensions of the wedge based bulb. Some vehicle applications recess part of the glass envelope in the socket when installed for various reasons as shown in FIG. 6.

Figure 28:
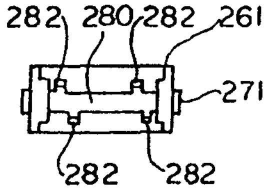
FIG. 28 is a top view of the retaining clip for the fifth embodiment.

Reference number 192 denotes either a one piece plastic base with the wedge 199 being part of it or it can denote a separate clip where 199 is actually part of the glass envelope that is pressed flat into a wedge that passes through the hollow clip similar to 261 in FIG. 28.

The standard wedge in either case is about 0.625 inch wide by about 0.1 inch thick by about 0.333 inch long. The bulb FIG. 19 is held into its vehicle socket by two opposite tapered side tabs 195 and two opposite tapered horizontal front and back ridges 193.

Figure 23:
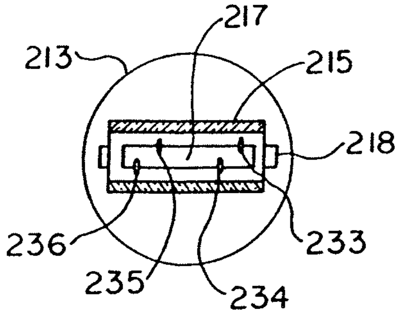
FIG. 23 is a bottom view of the fourth embodiment of the present invention.

Four wire conductors 194 extend out of the bottom of the wedge 199. The outer two are connected to the brake or turn filament and the inner two are connected to the tail filament. They are spaced to match the standard vehicle socket. The turn signal bulb does not have the inner two wires or filament 191 but is otherwise the same. The wires 194 are alternately folded back against the wedge parallel to each other as shown in FIGS. 23 and 19.

Figure 20:
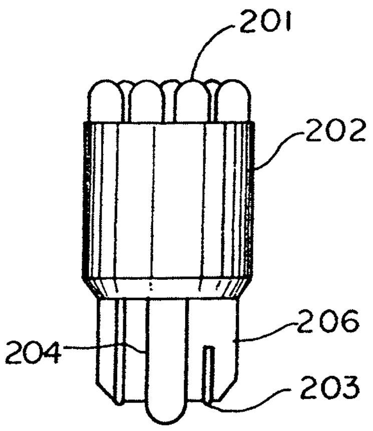
PRIOR ART FIG. 20
FIG. 20 is a perspective view of a prior art wedge base LED bulb housing.

The wedge base described in U.S. Pat. No. 5,160,200 illustrated in FIG. 20 is physically limited for vehicle lamp use because the base design 206 and central leg 204 will not allow it to fit the standard socket connector designed for base 192 of FIG. 19. It is not geometrically provided for to replicate the existing vehicle incandescent bulbs FIG. 19. Having a cylindrical portion 202, the width 201 can not equal the incandescent bulb 197 and therefore limits the brightness and usefulness. It has no side tabs 195 or horizontal ridges 193 to hold it into a socket.

Figure 21:
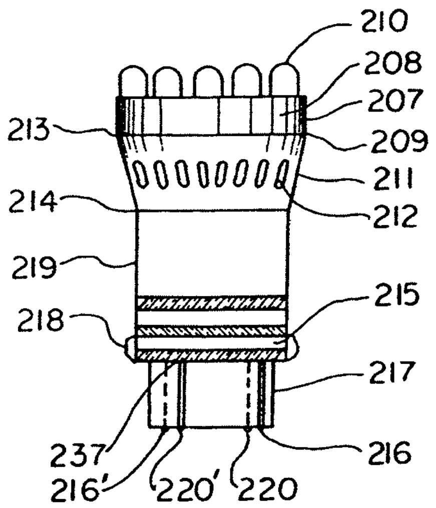
FIG. 21 is a perspective view of a fourth embodiment of the present invention showing a wedge base LED bulb which will fit into standard automotive wedge type brake/tail/turn lamp sockets.
Figure 22:
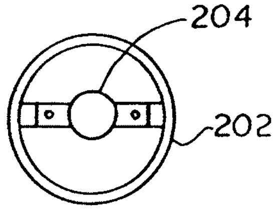
PRIOR ART FIG. 22
FIG. 22 is a bottom view of a prior art wedge base LED bulb housing.

A side view of the fourth preferred embodiment is shown in FIG. 21. It is a wedge based vehicle LED lamp module to replace the incandescent brake/tail and turn lamp in FIG. 19. It is identical in electrical operation to the first and second embodiments. The body is shaped to replicate the prior art incandescent bulb. The hollow funnel shaped body 211 is about one inch diameter at the top 213 where it flattens out and extends an additional 0.2 inches to encase printed circuit board 207 having top side 208 and bottom side 209 wherein a plurality of LED's 210 which are mounted on the top side of the printed circuit board as in the prior embodiments. This size is the same as the maximum diameter of prior art bulb illustrated in FIG. 19. Wedge base 217 of FIG. 21 is about 0.625 inch wide by 0.1 inch thick by 0.333 long. It has four bores 233, 234, 235, 236 through the length of the wedge as shown is FIGS. 21 and 23. As shown in the bottom view of FIG. 23 four wire conductors 216, 216', and 220, 220' extend out of the base. The bores are positioned to match those in base 192 of the prior art incandescent bulb of FIG. 19. The outer two wires 216 and 216' and inner two wires 220, and 220' are alternately folded back against the wedge base 217 and are parallel to each other and are held in place on opposite sides of the wedge base by receivers 237, where the receivers are slots in the base of a size to accommodate the wires. The two opposite tapered side tabs 218 and the two opposite tapered front and back ridges 215 hold the embodiment in a vehicle lamp socket. Body 219 has the same 0.77 inch width as prior art base 192 for a distance of about 0.66 inch from the top of each side tabs 218 to a point 214. At this point, the body begins to taper out at about 22 degrees with respect to the vertical and transforms from a wedge to a funnel shaped hollow body that extends to transition point 213 where it is a diameter of about one inch. These described dimensions keep this embodiment within the dimensional limits of the prior art bulb shown in FIG. 19 so it will fit all vehicle applications including those where part of the glass envelope is recessed in the socket similar to that described in FIG. 6. The positions and dimensions of the tabs, ridges, tapers, wedges, and conductors are identical to those of standard incandescent bulbs as described in the prior art FIG. 19. Air holes 212 provide for convective air cooling of the control circuitry and LED's to prevent loss of brightness over time.

Figure 24:
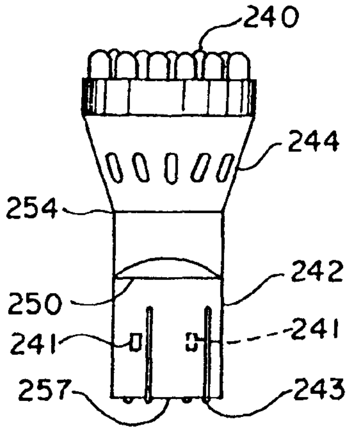
FIG. 24 is a perspective side view of a fifth embodiment of the present invention showing a wedge base LED bulb with a separate retaining clip which will fit into standard automotive wedge type brake/tail/turn lamp sockets.
Figure 25:
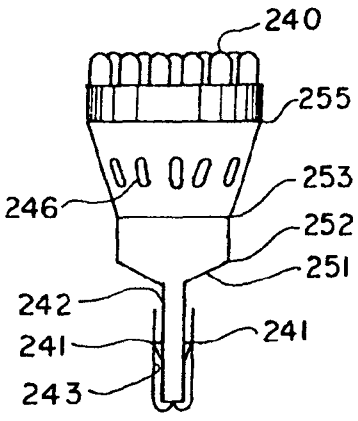
FIG. 25 is perspective edge view of the fifth embodiment.

Referring now to FIGS. 24 through 28, front and side views of a fifth preferred embodiment are shown in FIGS. 24 and 25 respectively. This embodiment is identical in operation and function as the fourth preferred embodiment. The plastic 244 body is essentially the same also with the main difference being it is a two piece body where the fourth preferred embodiment is a single piece.

Figure 26:
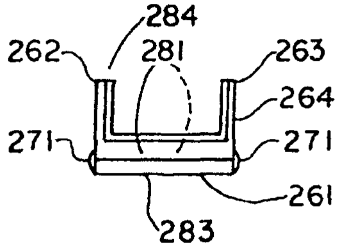
FIG. 26 is a side view of the retaining clip used for bulb body of the fifth embodiment.
Figure 27:
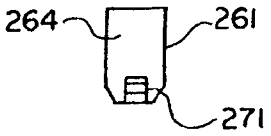
FIG. 27 is an edge view of the retaining clip for the fifth embodiment.

Retaining clip 261 with first portion 283 and protruding portion 284 is shown in FIGS. 26, 27, and 28. Its function is to hold the bulb in its vehicle socket by two opposite tapered side tabs 271 and two opposite tapered horizontal front and back ridges 281 allowing it to fit in the standard vehicle wedge based bulb brake/tail and turn lamp socket. The width of the clip from point 262 to 263 is 0.77 inches. The thickness of each side tab 271 is about 0.05 inches out from each side 264. The width of each horizontal ridge 281 is 0.100 inches at the top and 0.188 inches at the base as it tapers out. The ridges 281 are 0.79 inches long. The rectangular opening 280 is about 0.63 inch by 0.1 inch to receive the wedge 242. The opening 280 has four grooves positioned and sized to accommodate the wire conductors 243.

The wire conductors 243 are folded back against the wedge 242 parallel to each other. The conductors 243 are thereby formed and positioned to receive the retaining clip. The retaining clip 261 is oriented to install on bulb wedge base 242 where the wedge fits into hole 280 at first part 283 and extends out of protruding second portion 284 and wire conductors 243 line up with grooves 282. The clip 261 is held in place by locking tabs 241 leaving 0.333 inch of wedge base 242 extending downward as positioned in FIG. 24. The clip 261 holds the conductors 243 in place. The flat wedge base 242 is about 0.625 inch wide by 0.1 inch thick and extends about 0.575 inch from the bottom 257 to the top 250. At that point it begins to taper out at about a 50-degree angle 251 to form a 0.610 inch diameter cavity at point 252. At that point the body angle flattens out to about 2 to 3 degrees and continues upward for about 0.3 inch to point 253. At that point the body angle 254 changes to about 35 degrees and extends upward for about 0.4 inch to a maximum diameter of about one inch at point 255. At that point the body flattens back out and continues up another 0.2 to 0.3 inch to encase the LED's 240. The funnel shaped hollow body 244 houses the control and circuitry described in FIGS. 9 and 11. A sectional view would indicate an inner slot similar to 104 to hold an optional vertical circuit card. Air holes 246 in the funnel shaped portion allow convection air cooling of the LED's and circuitry to prevent loss of brightness over time. The plastic body 244 of the wedge base lamp embodiment provides for single and dual element socket connections 243 for use as brake/tail and turn signal applications.

Figure 29:
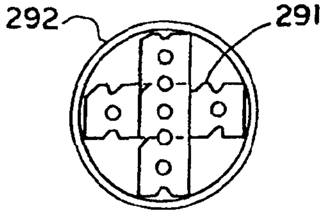
FIG. 29 is a top view of present invention showing high power four-leg automotive brake type LED's.
Figure 30:
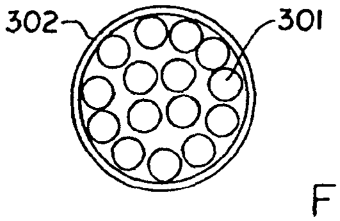
FIG. 30 is a top view of present invention showing standard T1 (3 mm) or T1 ¾ (5 mm) LED's.

FIGS. 29 and 30 show two of many different possible LED types and arrangements. FIG. 29 shows high power four-leg automotive type LED's 291 fitted in the same body 292 previously described in the preferred embodiments. FIG. 30 shows standard LED's 301 either size T1 (3 mm) or T1 ¾ (5 mm) fitted in the same body 302 previously described in the preferred embodiments.

Figure 31:
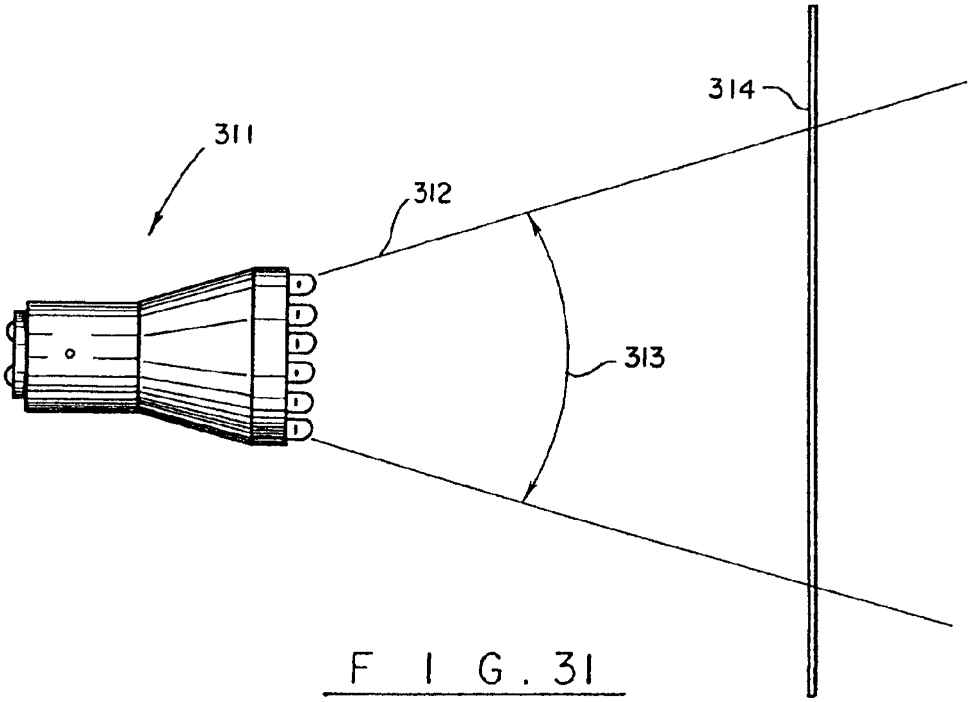
FIG. 31 is a side view of a typical viewing angle of the light beam of the present invention.

FIG. 31 shows a side view of the viewing angle 313 of the light 312 shining from typical preferred embodiment 311 through the vehicle lamp assembly lens 314. A beam angle 313 of about 30 degrees is shown. This is variable from 3 degrees to 70 degrees and may be higher by selection of LED's.

Figure 32:
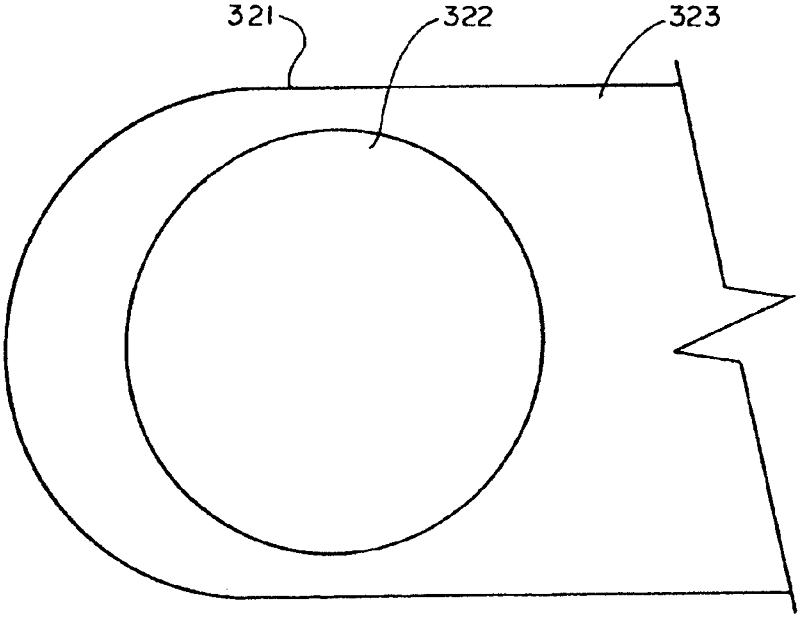
FIG. 32 is a rear view of a typical vehicle brake/tail/turn lamp assembly showing the intense light pattern on the lens.

FIG. 32 is a rear view of a typical vehicle's rear signal lamp assembly lens 321 showing a typical area 322 illuminated by any of the preferred embodiments. The surrounding area 323 is dimmer than the illuminated area. The viewing angle, brightness, number, and alignment of the LED's in all the embodiments determine the illumination area and pattern 322.

Figure 33:
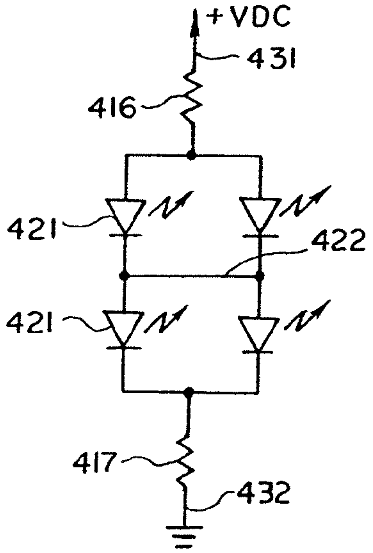
FIG. 33 is a circuit diagram for a mini wedge bulb of the present invention designed for single element operation.
Figure 34:
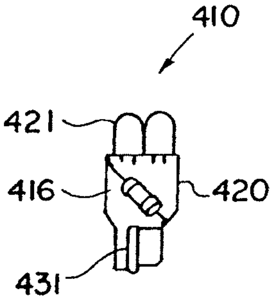
FIG. 34 is a front view of the bulb of FIG. 33.
Figure 35:
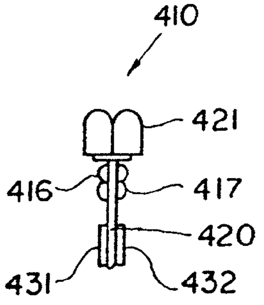
FIG. 35 is a side view of the bulb of FIG. 33.

FIGS. 33, 34, and 35 show a mini wedge bulb 410 of the present invention designed for single element operation. Bulb 410 includes four LEDs 421 in a 2×2 array mounted on a PCB 420. There is a jumper wire 422 (see FIG. 33) to enable one LED to fail without making the other series LED lose current and thus operation (otherwise one LED failing will cause two LEDs to go out). Resistors 416 and 417 limit current through and voltage drop across the LEDs to acceptable levels for the ratings of the LEDs 421. Bulb 410 is polarized (+ to + and – to –). Resistors 416 and 417 can be thru hole resistors or they can be surface mounted on PCB 420. PCB 420 preferably is substantially fully plated with metal on both sides, with only relatively thin etch lines defining positive contact 431 and ground contact 432 by electrically separating these contacts from the metal to which LEDs 421 are electrically connected; this enables PCB 420 to act as a heat sink for the LEDs 421 and resistors 416 and 417, which allows LED operation at higher current and brightness without degradation or heat build up.

PCB 420 acts as the bulb body for mini wedge bulb 410 and provides as well electrical connections for its electrical components (LEDs and resistors).

Mini wedge bulb 410 can replace any 3 digit automotive bulb. Mini wedge bulb 410 (or one quite similar to it) is commercially available from Jam Strait, Inc. as the following product numbers in the following colors: 194-HR Hyper-Bright Red; 194-HA Hyper-Bright Amber; 194-HG Hyper-Bright Green; 194-HB Hyper-Bright Blue; and 194-SW Super-Bright White.

The outline of PCB 420 is preferably approximately the same as the smaller 3 digit incandescent bulbs such as 194. The thickness of PCB 420 (with wire as a contact, or trace on the PCB 420 as a contact, or both) preferably approximately equals the thickness of 194 bulb wedge base with wire. The height of PCB 420 with LEDs 421 is preferably less than the height of the 194 incandescent bulb.

Figure 36:
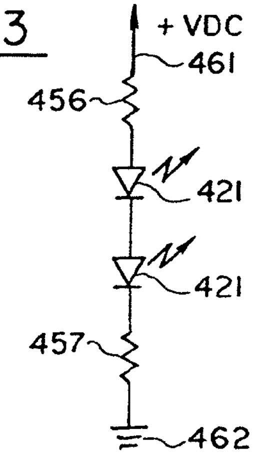
FIG. 36 is a circuit diagram for another embodiment of a mini wedge bulb of the present invention designed for single element operation.
Figure 37:
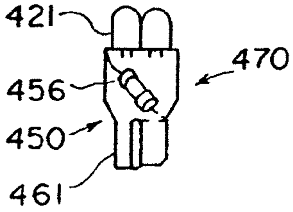
FIG. 37 is a front view of the bulb of FIG. 36.
Figure 38:
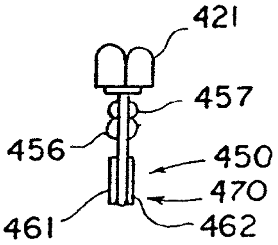
FIG. 38 is a side view of the bulb of FIG. 36.

FIGS. 36, 37, and 38 show another mini wedge bulb 450 of the present invention designed for single element operation. Bulb 450 includes two LEDs 421 mounted on a PCB 470. Resistors 456 and 457 limit current through and voltage drop across the LEDs to acceptable levels for the ratings of the LEDs 421. Bulb 450 is polarized (+ to + and – to –). Resistors 456 and 457 can be thru hole resistors or they can be surface mounted on PCB 420. PCB 470 preferably is substantially fully plated with metal on both sides, with only relatively thin etch lines defining positive contact 461 and ground contact 462 by electrically separating these contacts from the metal to which LEDs 421 are electrically connected; this enables PCB 470 to act as a heat sink for the LEDs 421 and resistors 456 and 457, which allows LED operation at higher current and brightness without degradation or heat build up.

PCB 470 acts as the bulb body for mini wedge bulb 450 and provides as well electrical connections for its electrical components (LEDs and resistors).

Mini wedge bulb 450 can replace any 3 digit automotive bulb.

The outline of PCB 470 is preferably approximately the same as the smaller 3 digit incandescent bulbs such as 194. The thickness of PCB 470 (with wire as a contact, or trace on the PCB 470 as a contact, or both) preferably approximately equals the thickness of 194 bulb wedge base with wire. The height of PCB 470 with LEDs 421 is preferably less than the height of the 194 incandescent bulb.

The LEDs 421 of mini wedge bulb 450 could be connected in parallel, rather than in series as shown, so that if one were to go out the other would still work.

Figure 39:
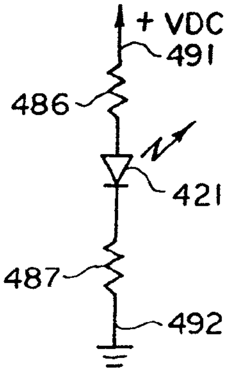
FIG. 39 is a circuit diagram for a single LED embodiment of a mini wedge bulb of the present invention designed for single element operation.
Figure 40:
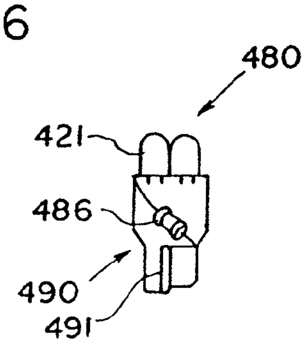
FIG. 40 is a front view of the bulb of FIG. 39.
Figure 41:
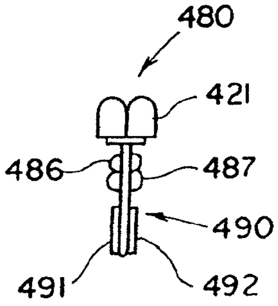
FIG. 41 is a side view of the bulb of FIG. 39.

FIGS. 39, 40, and 41 show another mini wedge bulb 480 of the present invention designed for single element operation. Bulb 480 includes a single LED 421 mounted on a PCB 490. Resistors 486 and 487 limit current through and voltage drop across the LED to acceptable levels for the ratings of the LED 421. Bulb 480 is polarized (+ to + and – to –). Resistors 486 and 487 can be thru hole resistors or they can be surface mounted on PCB 420. PCB 490 preferably is substantially fully plated with metal on both sides, with only relatively thin etch lines defining positive contact 491 and ground contact 492 by electrically separating these contacts from the metal to which LED 421 is electrically connected; this enables PCB 490 to act as a heat sink for the LED 421 and resistors 486 and 487, which allows LED operation at higher current and brightness without degradation or heat build up.

PCB 490 acts as the bulb body for mini wedge bulb 480 and provides as well electrical connections for its electrical components (LEDs and resistors).

Mini wedge bulb 480 can replace any 3 digit automotive bulb.

The outline of PCB 490 is preferably approximately the same as the smaller 3 digit incandescent bulbs such as 194. The thickness of PCB 490 (with wire as a contact, or trace on the PCB 490 as a contact, or both) preferably approximately equals the thickness of 194 bulb wedge base with wire. The height of PCB 490 with LED 421 is preferably less than the height of the 194 incandescent bulb.

Figure 42:
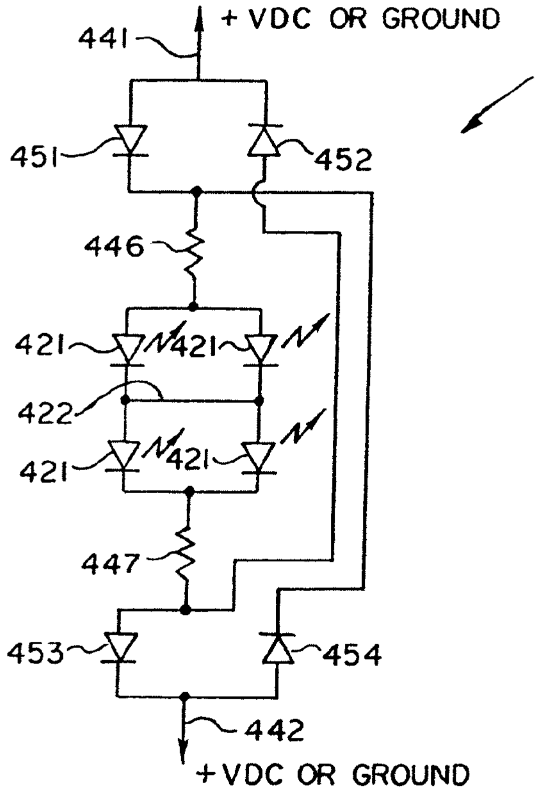
FIG. 42 is a circuit diagram for a non-polarized embodiment of a mini wedge bulb of the present invention designed for single element operation.

FIG. 42 shows a circuit diagram for mini wedge bulb 440 of the present invention designed for single element operation (the front and side views of bulb 440 are similar to FIGS. 34 and 35, but additionally include diodes 451, 452, 453, and 454 connected as shown in FIG. 42). Bulb 440 includes four LEDs 421 in a 2×2 array mounted on a PCB 460. There is a jumper wire 422 to enable one LED to fail without making the other series LED lose current and thus operation (otherwise one LED failing will cause two LEDs to go out). Resistors 446 and 447 limit current through and voltage drop across the LEDs to acceptable levels for the ratings of the LEDs 421. Bulb 440 is non-polarized (it may be installed + to + and − to − or + to −& − to + and still operate properly) due to diodes 451, 452, 453, and 454. Resistors 446 and 447 can be thru hole resistors or they can be surface mounted on a PCB, such as PCB 420, which preferably is substantially fully plated with metal on both sides, with only relatively thin etch lines defining first contact 441 and second contact 442 (either of which can be ground or positive) by electrically separating these contacts from the metal to which LEDs 421 are electrically connected; this enables the PCB to act as a heat sink for the LEDs 421 and resistors 414 and 447, which allows LED operation at higher current and brightness without degradation or heat build up.

The PCB acts as the bulb body for mini wedge bulb 440 and provides as well electrical connections for its electrical components (LEDs and resistors).

Mini wedge bulb 440 can replace any 3 digit automotive bulb.

The outline of the PCB is preferably approximately the same as the smaller 3 digit incandescent bulbs such as 194. The thickness of the PCB (with wire as a contact, or trace on the PCB as a contact, or both) preferably approximately equals the thickness of 194 bulb wedge base with wire. The height of the PCB with LEDs 421 is preferably less than the height of the 194 incandescent bulb.

Non-polarized bulbs similar to bulb 440, but with one or two LEDs 421, can also be made.

The total current through bulb 440 is preferably 100 mA maximum, with preferably a maximum applied voltage of 13.8 VDC.

Resistors 416 and 417 could be replaced with a single, larger value resistor, but in many cases, especially in high current bulbs, two smaller value resistors fit better in the bulb. This is also the case with resistors 456 and 457, resistors 486 and 487, and resistors 446 and 447.

Figure 43:
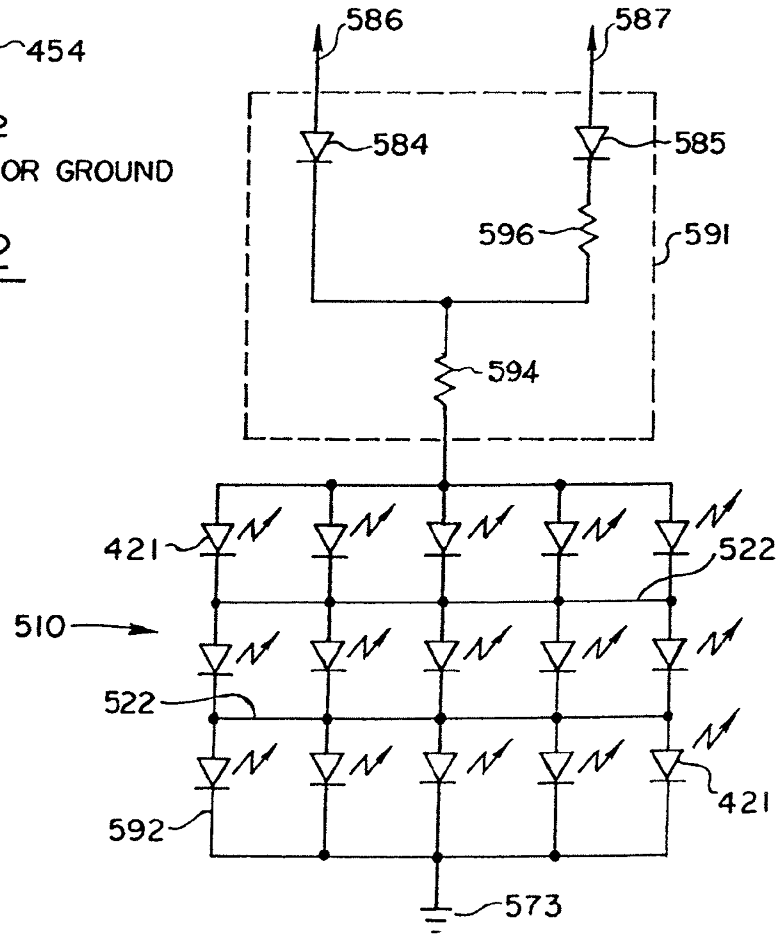
FIG. 43 is a circuit diagram for a bulb which is similar to the bulb shown in FIGS. 7-9, but which has a different array of LEDs, and which has a slightly different control circuit.

FIG. 43 shows a circuit diagram for a bulb 510 which is similar to the bulb shown in FIGS. 7-9, but which has a 3×5 array 592 of LEDs 421 instead of a 5×3 array, and which has a slightly different control circuit 591. Control circuit 591 includes two diodes 584 and 585 and a resistor 594 which is in series with both the brake/turn light contact 586 and the tail light contact 587. Control circuit 591 also includes a resistor 596 in series with tail light contact 587 to reduce the brightness of LEDs 421 when only the tail light is on. Diode 584 serves the same purpose as diode 95, and diode 585 provides blocking current from back flowing from brake/turn signal contact 586 through resistor 596 and into the vehicle tail circuit to other bulbs in running lights.

Bulb 510 also differs from the bulb shown in FIGS. 7-9 in that it includes jumpers 522 electrically connecting all LEDs 421 in each row so that the failure of one LED 421 in a column will not cause all LEDs 421 in that column to fail.

Bulbs similar to bulb 510 could include, for example, an eight LED array—2 in series×4 parallel branches, or 4 in series×2 parallel branches, a twelve LED array (2×6, 3×4, 4×3, or 6×2), a fifteen LED array (3×5, 5×3), or a sixteen LED array (2×8, 4×4, 8×2).

Bulb 510 preferably includes a PCB, similar to PCB 82 in FIG. 8, but which is metal plated on both sides with thin etch lines for electrical separation, providing a heat sink for LEDs to run with higher current, brighter operation, and longer life. The metal plating preferably covers substantially all of the surface of the PCB.

Resistors 594 and 596 are preferably mounted on the PCB, rather than suspended in air, which makes them less susceptible to vibration damage.

Resistor 594 in series with resistor 596, with a shunt for resistor 596 provides full brightness with brake light and turn light use and no added current/brightness if the tail light is also turned on. This allows one to set the brake light/turn light current higher than would otherwise be possible.

Figure 44:
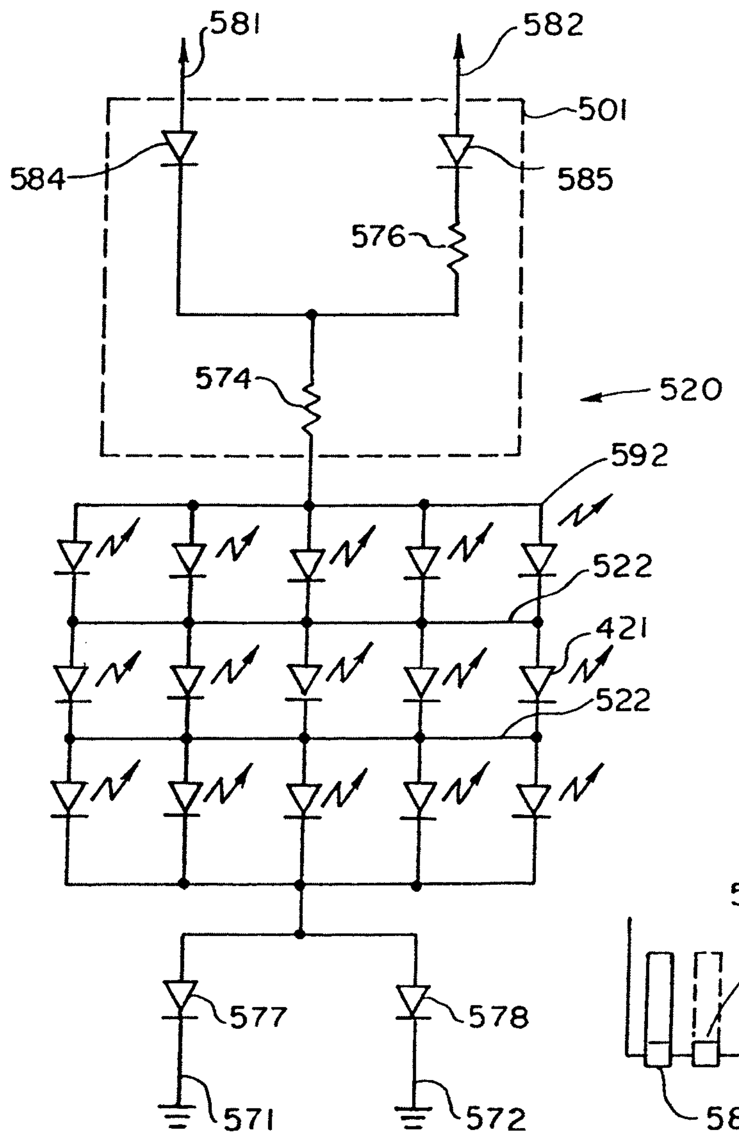
FIG. 44 is a circuit diagram for a bulb which is similar to the wedge based vehicle LED lamp module shown in FIGS. 21 and 23, but which includes additional blocking diodes.
Figure 45:
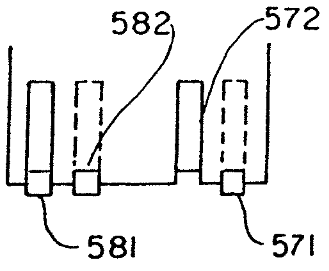
FIG. 45 is a detail of the bulb of FIG. 44.

FIGS. 44 and 45 show a wedge based bulb 520 similar to the wedge based vehicle LED lamp module shown in FIGS. 21 and 23. Bulb 520 includes a positive brake/turning light contact 581, a positive tail light contact 582, control circuitry 501, a 3×5 array 592 of LEDs 421, a ground brake/turn signal contact 571, and a ground tail light contact 572. A diode 577 is in series between the LED array 592 and ground contact 571. A diode 578 is in series between the LED array 592 and ground contact 572.

Figure 46:
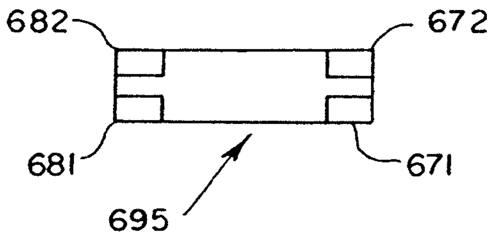
FIG. 46 PRIOR ART
FIG. 46 is a detail of a socket which receives the bulb of FIG. 44.

FIG. 46 shows a socket 695 in which bulb 520 is received.

Control circuitry 501 includes a resistor 574 in series between contacts 581 and 582 and LED array 592, a diode 584 in series between contact 581 and resistor 574, and a diode 585 and a resistor 576 in series between contact 582 and resistor 574. Resistor 576 reduces the brightness of LEDs 421 when only the tail light is on. Diodes 584 and 585 function as in bulb 510.

Bulb 520 also differs from the bulb shown in FIGS. 21 and 23 in that it includes jumpers 522 electrically connecting all LEDs 421 in each row so that the failure of one LED 421 in a column will not cause all LEDs 421 in that column to fail.

Bulbs similar to bulb 520 could include, for example, an eight LED array—2 in series×4 parallel branches, or 4 in series×2 parallel branches, a twelve LED array (2×6, 3×4, 4×3, or 6×2), a fifteen LED array (3×5, 5×3), or a sixteen LED array (2×8, 4×4, 8×2).

Bulb 520 preferably includes a PCB, similar to PCB 82 in FIG. 8, but which is metal plated on both sides with thin etch lines for electrical separation, providing a heat sink for LEDs 421 to run with higher current, brighter operation, and longer life. The metal plating preferably covers substantially all of the surface of the PCB.

Resistors 574 and 576 are preferably mounted on the PCB, rather than suspended in air, which makes them less susceptible to vibration damage.

Resistor 574 in series with resistor 576, with a shunt for resistor 576 provides full brightness with brake light and turn light use and no added current/brightness if the tail light is also turned on. This allows one to set the brake light/turn light current higher than would otherwise be possible.

Diodes 577 and 578 block a short to ground if bulb 520 is used in CK applications (that is, if used in situations for which Jam Strait, Inc. bulbs numbered 3157-XXCK are designed—see application guide below).

Figure 47:
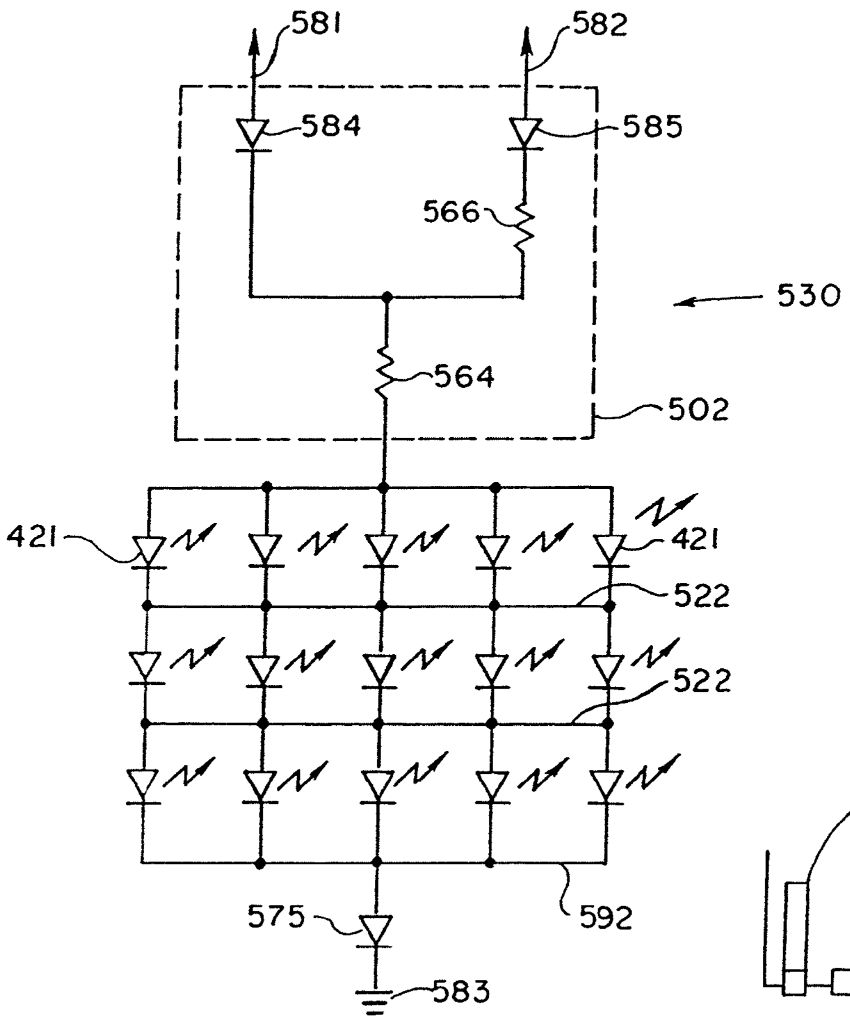
FIG. 47 is a circuit diagram for a bulb which is similar to the wedge based vehicle LED lamp module shown in FIGS. 21 and 23, but which includes additional blocking diodes and is wired differently.
Figure 48:
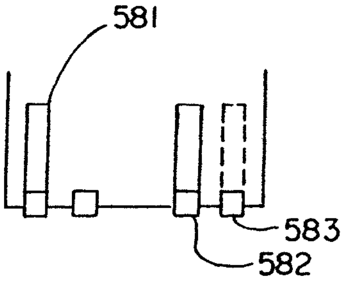
FIG. 48 is a detail of the bulb of FIG. 47.

FIGS. 47 and 48 show bulb 530, which can be essentially the same as bulb 520 with two major exceptions—contacts 581 and 582 are in different locations and there is a single ground contact 583; these exceptions are to accommodate wiring differences in certain applications. Bulb 530 is designed for use in CK applications.

Wedge based bulb 530 is similar to the wedge based vehicle LED lamp module shown in FIGS. 21 and 23. Bulb 530 includes a positive brake/turning light contact 581, a positive tail light contact 582, control circuitry 502, a 3×5 array 592 of LEDs 421, and a ground contact 583. A diode 577 is in series between the LED array 592 and ground contact 583. Diode 575 is optional, and serves to allow the values of resistor 564 and resistor 566 to be the same as a standard 3157 bulb (such as resistors 574 and 576, respectively, of bulb 520) to help reduce parts inventory.

Control circuitry 502 includes a resistor 564 in series between contacts 581 and 582 and LED array 592, a diode 584 in series between contact 581 and resistor 564, and a diode 585 and a resistor 566 in series between contact 582 and resistor 576. Resistor 576 reduces the brightness of LEDs 421 when only the tail light is on. Diodes 584 and 585 function as in bulb 510.

Bulb 530 also differs from the bulb shown in FIGS. 21 and 23 in that it includes jumpers 522 electrically connecting all LEDs 421 in each row so that the failure of one LED 421 in a column will not cause all LEDs 421 in that column to fail.

Bulbs similar to bulb 530 could include, for example, an eight LED array—2 in series×4 parallel branches, or 4 in series×2 parallel branches, a twelve LED array (2×6, 3×4, 4×3, or 6×2), a fifteen LED array (3×5, 5×3), or a sixteen LED array (2×8, 4×4, 8×2).

Bulb 530 preferably includes a PCB, similar to PCB 82 in FIG. 8, but which is metal plated on both sides with thin etch lines for electrical separation, providing a heat sink for LEDs 421 to run with higher current, brighter operation, and longer life. The metal plating preferably covers substantially all of the surface of the PCB.

Resistors 564 and 566 are preferably mounted on the PCB, rather than suspended in air, which makes them less susceptible to vibration damage.

Resistor 564 in series with resistor 566, with a shunt for resistor 566 provides full brightness with brake light and turn light use and no added current/brightness if the tail light is also turned on. This allows one to set the brake light/turn light current higher than would otherwise be possible.

Figure 49:
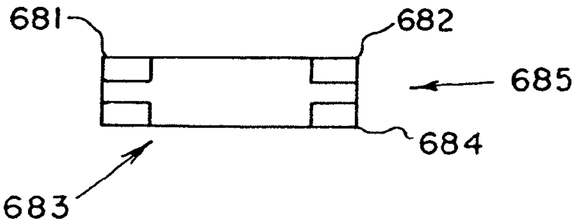
FIG. 49 PRIOR ART
FIG. 49 is a detail of a socket which receives the bulb of FIG. 47.

FIG. 49 shows a socket 685 in which bulb 530 is received.

Figure 50:
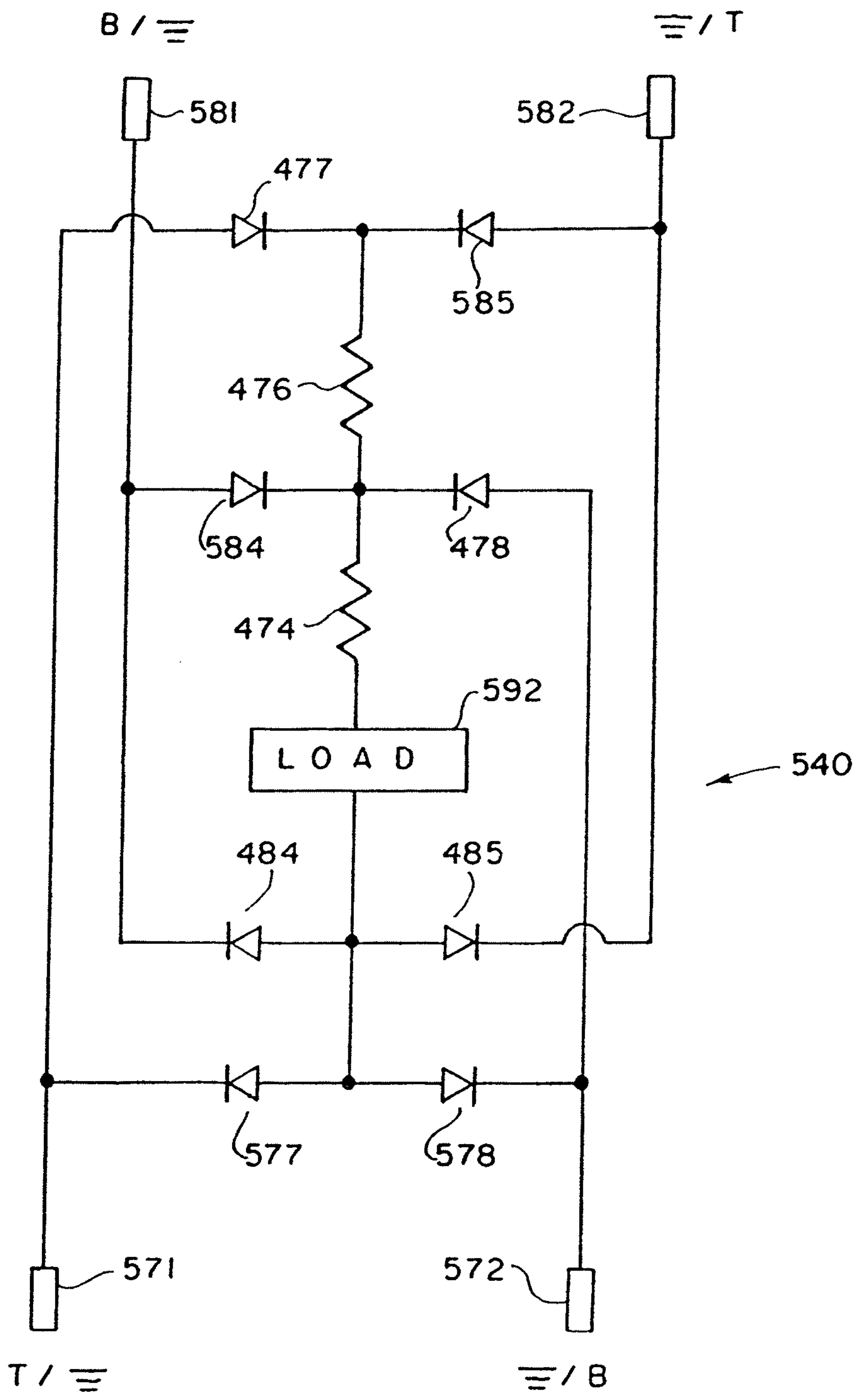
FIG. 50 is a circuit diagram for a non-polarized 3157 LED bulb.

One could make a non-polarized 3157 bulb which could act as a universal 3157 replacement for standard wedge 3157 bulbs and 3157-XXCK bulbs. To make such a universal replacement, one could apply the principles shown in FIG. 42 to bulb 520. Such a bulb, bulb 540, is shown in FIG. 50. Bulb 540 has four diodes more than bulb 520 (diodes 477, 478, 484, and 485), and different values of resistors (resistors 474 and 476) to account for the additional resistance caused by the additional diodes; otherwise, bulb 540 can be the same as bulb 520 in all respects, and in all mentioned variations regarding number and placement of LEDs. Bulb 540 is advantageous in that it can be placed in any socket requiring any 3157 bulb and either work properly in any orientation, or at least not blow any fuses or itself in any orientation and will work in at least one orientation in each socket.

Figure 51:
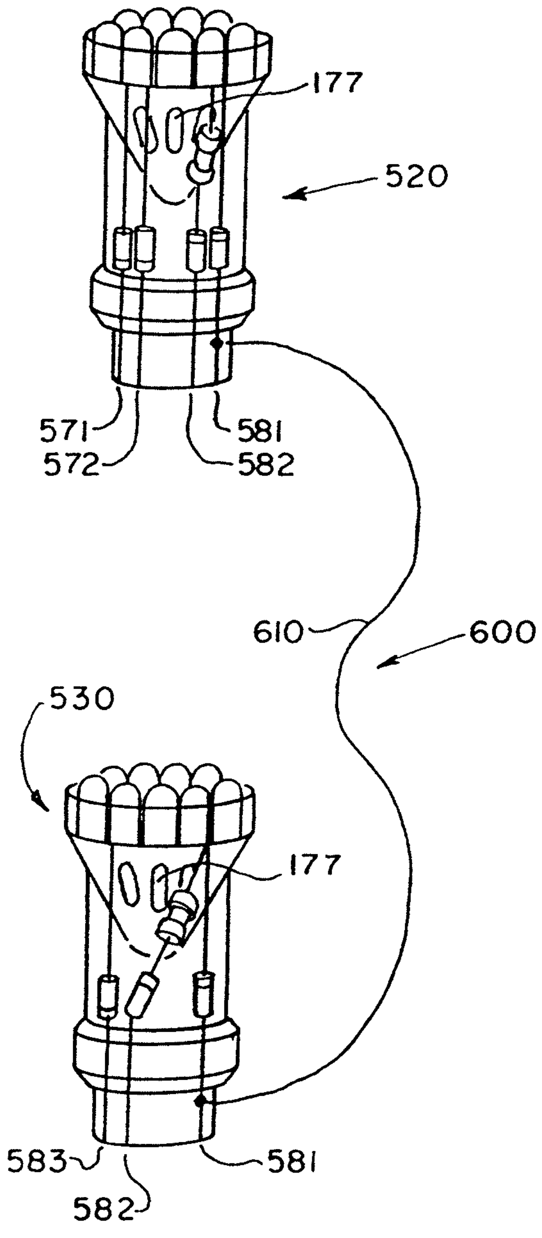
FIG. 51 shows a first set of bulbs wired together

FIG. 51 shows a set 600 of bulbs quite similar to those commercially available from Jam Strait, Inc. as 3157-S/HR and 3157-S/HRCK. Set 600 includes two bulbs 520 (see FIGS. 44-46) and 530 (see FIGS. 47-49) wired together (the positive brake/turn 581 contact of bulb 520 is directly electrically connected with an insulated wire 610 to the positive brake/turn 581 contact of bulb 530). These bulbs are used in vehicles where there is one socket for each turning and brake light and a separate socket for each brake light (such as 88-98 full size Chevy and GMC Trucks). Bulbs 520 and 530 are wired together in such a manner that both bulbs function as tail lamps and both lamps function as brake and turn lamps. This doubles brightness and visibility of the turning lights and brake lights (one could also wire together bulbs in a manner that, for example, only one bulb would work for tail and both would work for either brake or turn, or only one bulb would work for tail and both could work for brake and turn). Two sets 600 are required for each vehicle which uses sets 600.

Wire 610 is long enough to allow bulbs 520 and 530 to be properly installed without wire 620 becoming disconnected from either bulb.

No vehicle modifications are necessary to use sets 600.

Figure 52:
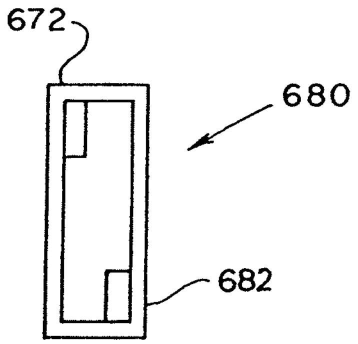
FIG. 52 PRIOR ART
FIG. 52 shows the top tail socket of a 88-98 Chevy or GMC truck.
Figure 53:
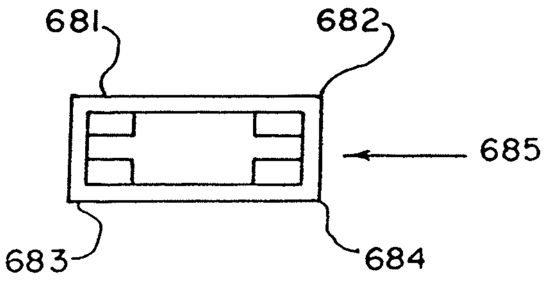
FIG. 53 PRIOR ART
FIG. 53 shows the center brake/turn socket of a 88-98 Chevy or GMC truck

FIG. 52 shows the top tail socket 680 of a 88-98 Chevy or GMC truck having a ground contact 672 and a tail light contact 682. FIG. 53 shows the center brake/turn socket 685 of a 88-98 Chevy or GMC truck having a brake/turn light contact 681, ground contacts 683 and 684, and a tail light contact 682. Socket 680 receives bulb 520 of set 600, and socket 685 receives bulb 530 of set 600.

As can be seen in FIG. 51, bulbs 520 and 530 each have cooling holes 177.

Figure 54:
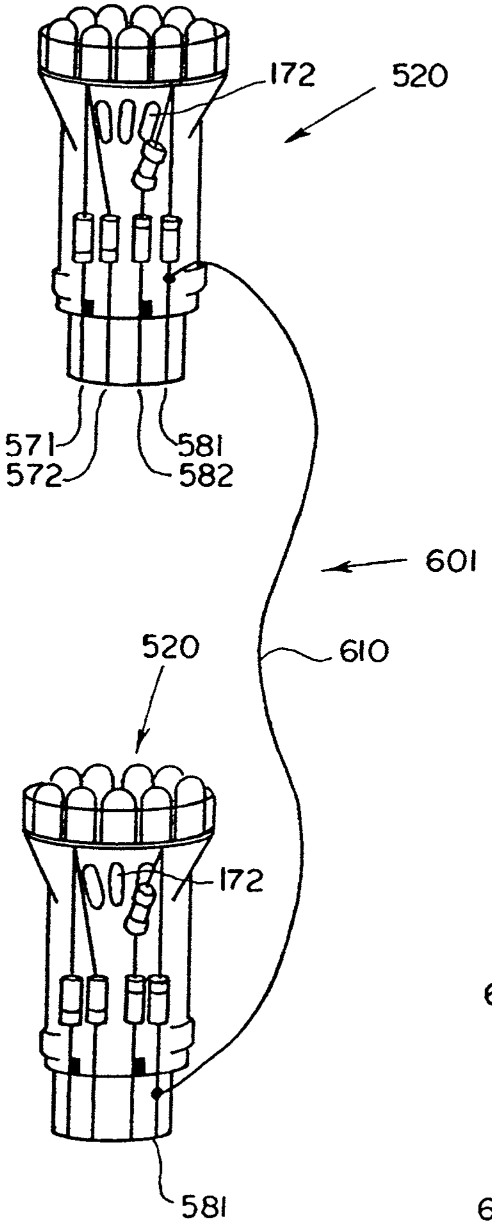
FIG. 54 shows a second set of bulbs wired together.
Figure 55:
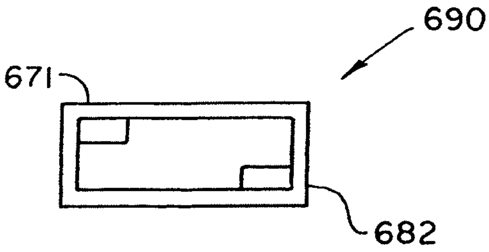
F I G. 55 PRIOR ART
FIG. 55 shows a tail socket which can be found in most automobiles which use 3157 bulbs.
Figure 56:
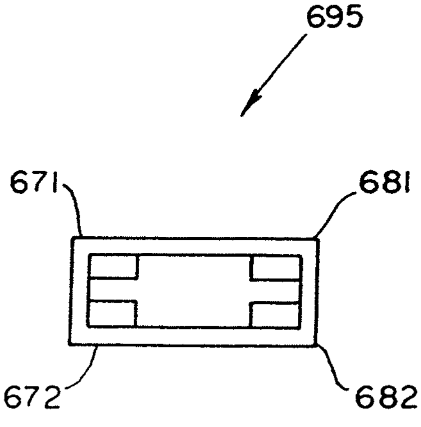
F I G. 56 PRIOR ART
FIG. 56 shows a brake/turn socket which can be found in most automobiles which use 3157 bulbs.

Set 601, shown in FIG. 54, is similar to set 600 but includes two bulbs 520. Set 601 is used in tail socket 690 and brake/turn socket 695. Tail socket 690 (FIG. 55) and brake/turn socket 695 (FIG. 56) can be found in most automobiles which use 3157 bulbs. Tail socket 690 includes tail contact 682 and ground contact 671. Brake/turn socket 695 includes brake/turn contact 681, tail contact 682, and ground contacts 671 and 672.

Figure 57:
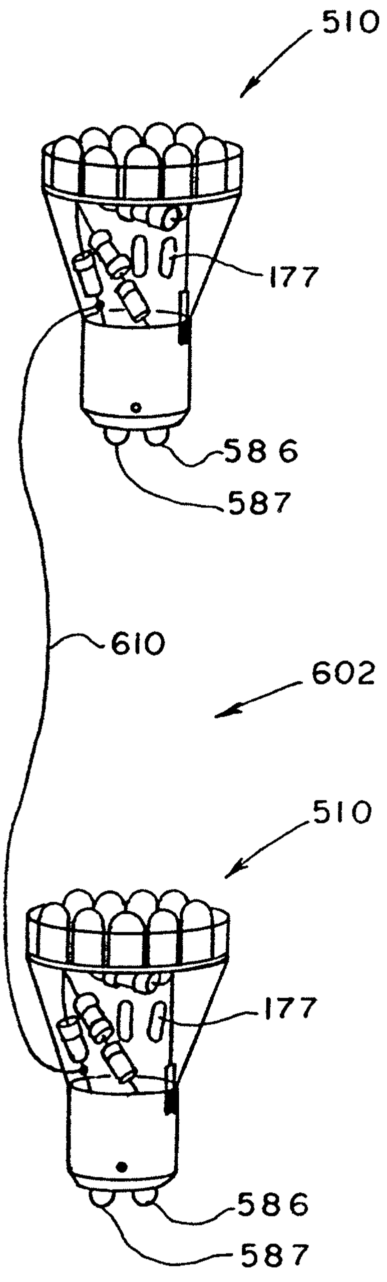
FIG. 57 shows a third set of bulbs wired together.
Figure 58:
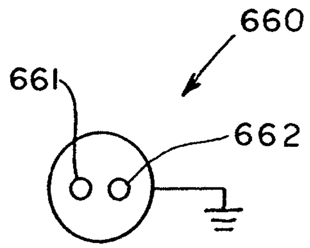
FIG. 58 PRIOR ART
FIG. 58 shows an 1157 tail lamp socket.
Figure 59:
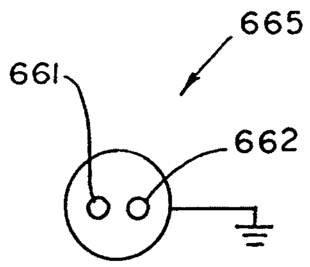
FIG. 59 PRIOR ART
FIG. 59 shows an 1157 tail lamp socket.

Set 602, shown in FIG. 57, is similar to sets 600 and 601 but includes two bulbs 510 (see FIG. 43). One bulb 510 of set 602 is used in a tail socket 660 and the other bulb 510 of set 602 is used in a brake/turn socket 665. Socket 660 is connected to ground and includes a brake/turn contact 661 which is not connected in the vehicle and a tail contact 662. Socket 665 is connected to ground and includes a brake/turn contact 661 which is connected in the vehicle and a tail contact 662. When properly installed, the brake/turn light contact 586 of the bulb 510 in the tail socket 660 is not in electrical contact with the tail socket (but wire 610 causes the bulb 510 in the tail socket 660 to operate as a brake light and turn light).

In all bulbs of the present invention, the metal plating preferably covers at least 10-20% of the surface of the PCB, more preferably at least 20-50% of the surface of the PCB, and most preferably 50-95% of the surface of the PCB. This allows the PCB tp act as a heat sink for the LEDs, allowing the LEDs to run with higher current, brighter operation, and longer life.

FIGS. 44, 45, 46, 50, 51, 52, 54, 55, and 56 show bulbs which are similar to or the same as bulbs which are commercially available from Jam Strait, Inc. on 15 Apr. 2002 as 3157 series bulbs. FIGS. 47, 48, 49, and 50 show bulbs which are similar to or the same as bulbs which are commercially available from Jam Strait, Inc. on 15 Apr. 2002 as 3157-CK series bulbs. FIGS. 43 and 57 show bulbs which are similar to or the same as bulbs which are commercially available from Jam Strait, Inc. on 15 Apr. 2002 as 1157 series bulbs. FIGS. 33-42 show bulbs which are similar to or the same as bulbs which are commercially available from Jam Strait, Inc. on 15 Apr. 2002 as 194 series bulbs.

Figure 60:
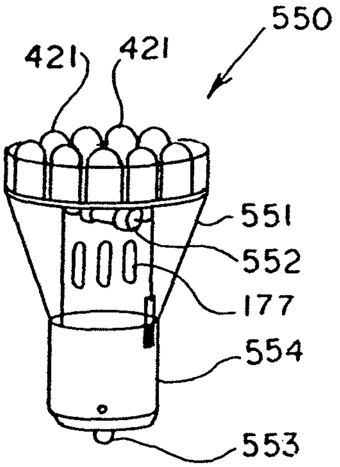
FIG. 60 shows an 1156 lamp of the present invention.
Figure 61:
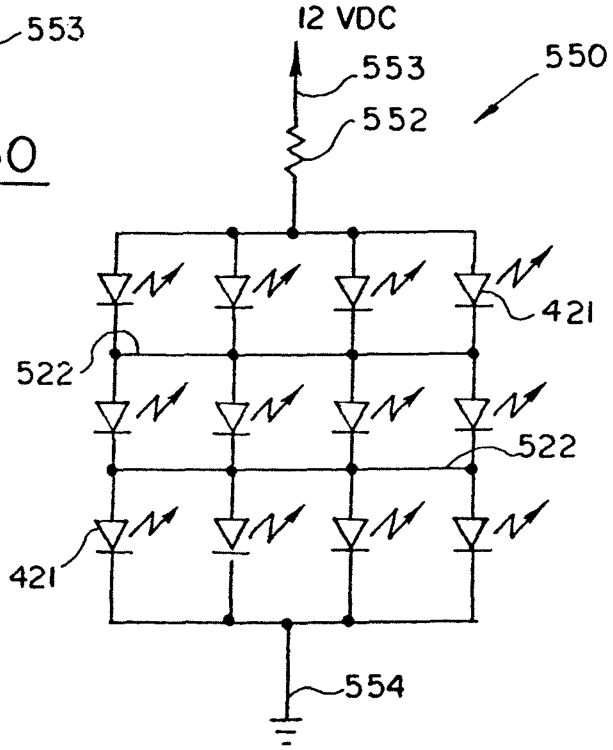
FIG. 61 is a circuit diagram of the lamp of FIG. 60.

FIGS. 60 and 61 show bulbs 550 which are commercially available from Jam Strait, Inc. on 15 Apr. 2002 as 1156 series bulbs. These 1156 series bulbs are similar to the 1157 series bulbs, but contain only a tail contact and only a single resistor—otherwise, they can have all of the features of the bulbs shown in FIGS. 43 and 57, with all of the variations described herein. The 1156 lamp 550 of the present invention shown in FIG. 60 differs from prior art 1156 LED lamps in that it has a housing 551 which is shaped to allow the bulb 550 to fit into a recessed socket (such as a recessed bulb socket similar to recessed bulb socket 63, but for tail lamps only) and in that it has cooling holes 177 in its housing 551. Further, The 1156 lamp 550 of the present invention is different from prior art 1156 bulbs in that it has jumper wires 522.

FIG. 61 is a circuit diagram of the 1156 lamp 550 of FIG. 60, showing an array of LEDs 421 including jumper wires 522, a ground contact 554, a tail contact 553 and a resistor 552.

Bulbs similar to bulb 550 could include, for example, a single LED, a four LED array, an eight LED array—2 in series×4 parallel branches, or 4 in series×2 parallel branches, a different twelve LED array (2×6, 3×4, or 6×2), a fifteen LED array (3×5, 5×3), a sixteen LED array (2×8, 4×4, 8×2), or even a 20 LED array (4×5, 5×4).

Figure 62:
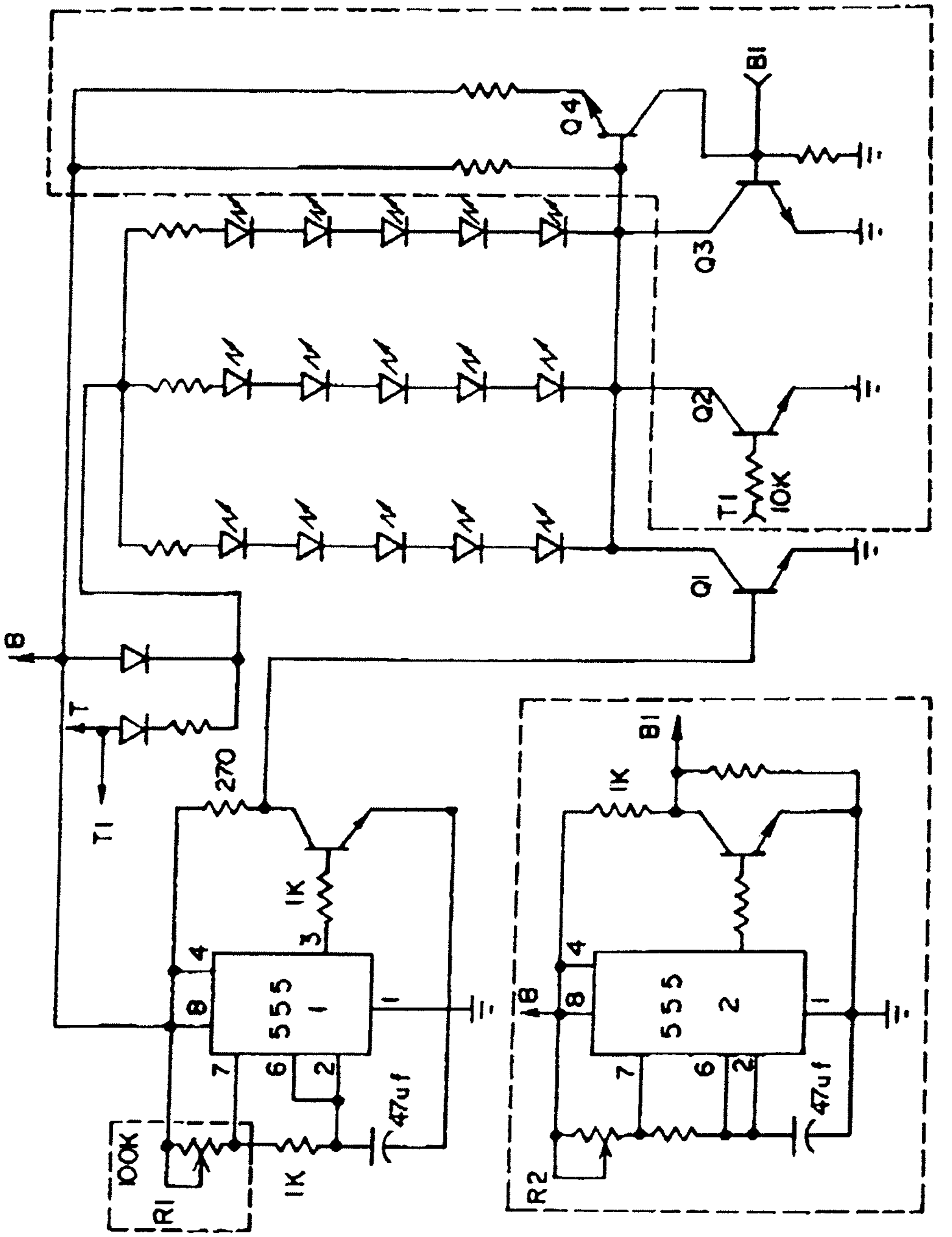
FIG. 62 is a circuit diagram for a pulse circuit.
Figure 63:
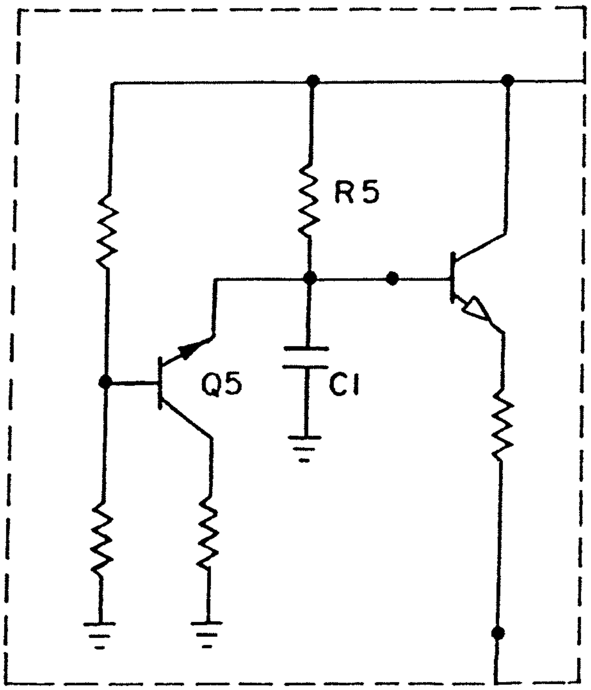
FIG. 63 is a detail of a circuit diagram for a pulse circuit.

The present invention includes an LED bulb with circuitry to pulse the LEDs during a braking condition for a plurality of pulses at 60 Hz or slower for added alert to affected motorists. The circuit diagram for this bulb could be similar to the one shown in FIGS. 11 and 12, but with a pulse circuit 112 which would cause the desired pulses. Such a circuit is shown in FIG. 62.

The present invention also includes an LED bulb with circuitry to pulse LEDs during a braking condition for a plurality of pulses at 60 Hz or slower for added alert to affects motorists, but in which the LED's turn full on after a predetermined number of pulses. The circuit diagram for this bulb could be similar to the one shown in FIGS. 11 and 12, but with a pulse circuit 112 which would cause the desired pulses. Such a circuit is shown in FIG. 62. In the circuit of FIG. 62, during brake conditions the circuit visually pulses the LEDs at a frequency set by R1, then latches the LEDs full on after a delay set by R2 (e.g., pulse, pulse, pulse, on). The pulse circuit resets when voltage is removed from the brake input. As shown in FIG. 62, the tail (T) bypasses the pulse/delay/latch circuit.

The present invention also includes an LED bulb with circuitry to pulse LEDs during a braking condition for a plurality of pulses at 60 Hz or slower for added alert to affects motorists, but in which the LED's do not turn full on. The circuit diagram for this bulb could be similar to the one shown in FIGS. 11 and 12, but with a pulse circuit 112 which would cause the desired pulses. Also, one could modify the circuit shown in FIG. 62 to remove the circuitry in the two lower dashed boxes (those containing 8-pin DIP timer 555-2 and transistors Q2, Q3, and Q4). In this modified circuit of FIG. 62, during brake conditions the circuit visually pulses the LEDs at a frequency set by R1, but does not latch the LEDs full on. The pulse circuit resets when voltage is removed from the brake input. As shown in FIG. 62, the tail (T) bypasses the pulse/delay/latch circuit.

The present invention also includes an LED bulb with circuitry to pulse the LEDs during a braking condition for a plurality of pulses initially at 60 Hz or slower for added alert to affected motorists, but the pulses speed up until visual persistence is optimized. The circuit diagram for this bulb could be similar to the one shown in FIGS. 11 and 12, but with a pulse circuit 112 which would cause the desired pulses. Such a circuit could be made by substituting the circuit shown in FIG. 62 for the dashed portion of the circuit of FIG. 62 including R1 and the 100K resistor (but leaving the rest of the circuit of FIG. 62 as is, including leaving in the other portions in dashed boxes). In this modified circuit, the pulses will speed up over time at a rate set up by R5/C1 until the LEDs are eventually visually persistent. This accelerating pulse repeats each time the brake is applied. Transistor Q5 turns on when brake voltage is removed, thus draining voltage from capacitor C1.

Jumper wires like jumper wires 522 can advantageously be used on any of the other embodiments of the present invention which have more than one LED.

Though it is preferred to have all LEDs illuminate in the brake, turn, and tail modes, with the LEDs illuminating brighter in brake and turn than in tail mode, it is still advantageous even if substantially all LEDs illuminate in the brake, turn, and tail modes, with the LEDs illuminating brighter in brake and turn than in tail mode. It is even advantageous if at least some LEDs illuminate in the brake, turn, and tail modes, with the LEDs illuminating brighter in brake and turn than in tail mode.

LEDs on all bulbs of the present invention may point at any direction including at a 90 degree angle to the base.

Figure 64:
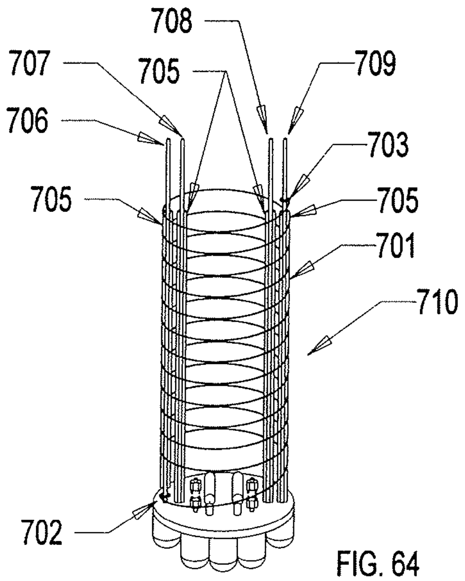
FIGS. 64-74 show additional embodiments of the present invention.

Another embodiment of the present invention, an LED Bulb with a built-in load equalizing resistor, is shown in FIG. 64.

The embodiment of the present invention shown in FIG. 64 is applicable to LED bulbs in general to solve any load matching requirements or needs. It applies to all single and dual brightness LED bulbs, both AC and DC, automotive, commercial, or industrial. The purpose of the built-in load resistor is to correct a load balance problem with prior art LED bulbs by making them pull more current. In general, prior art LED bulbs pull much less current than the incandescent bulb they replace. This causes flashers to flash fast, flashers to flash slow, flashers to not work at all, blown bulb indications for brake and turn in vehicles, cruise-control problems, and more. Prior art correction for this prior art problem is discussed in U.S. Pat. No. 6,371,636, and its subsequent pending patents, and is accomplished in many ways. Some known corrections are to replace or modify turn signal flashers, disconnect indicator lights, tape over indicator lights, add incandescent bulbs to the circuit under the vehicle and paint them black, and the present inventor's preferred method of adding external load resistors to the affected wiring of the vehicle.

The present invention can be designed to have similar or the same resistance or impedance as the standard incandescent bulb in some embodiments, and would simulate multiple incandescent bulbs in other embodiments for flexibility and cost savings on applications. A double-loaded LED bulb in parallel with an unloaded LED bulb equals 2 incandescent bulbs for example. Endless combinations exist. But the most popular model will preferably be a load similar to the O.E.M. bulb resistance.

The loads can be adapted to the bulbs in numerous optional ways. The resistance is optionally and preferably wires wrapped around insulated leads as shown in FIG. 64; it could be part of the housing, it could surround the housing, and/or it could be part of the base. It could take many shapes and forms. It could be made of wire, carbon, ceramic, metal oxide, metal film, or any other resistance medium. It could be one resistor or a network of many resistors. The resistance could also be in a socket that would plug into the incandescent bulb plug and receive the LED bulb.

The resistance could be variable. The resistance may be higher or lower than the resistance of the original intended bulb, as long as it accomplishes the purpose of allowing the new LED bulb to replace the original intended bulb without causing malfunctioning of the vehicle in which the LED bulb is used.

Heat dissipation is optionally accomplished in many ways from heat sinking, venting, coating in thermally conductive matter, or exposing outside of the enclosure. Enclosures, bases, PCBs, LEDs, and electronics are optionally and preferably made with materials compatible with the heat from the load-equalizing resistor.

The invention shown in FIG. 64 can be applied to any of the bulbs shown and/or described herein.

FIG. 64 shows a non-polarized 3157 type (housing not shown) bulb 710. This embodiment of the invention is applicable to all models and types of LED bulbs. One can connect the load between (−) and (+) of any bulb. There are four electrical insulators 705 to shield the incoming vehicle connector wires 706 (ground or brake/turn), 707 (tail or ground), 708 (ground or tail), 709 (brake/turn or ground) from the wound resistor 701. One connects one end 703 of the wire resistor 701 to ground and the other end 702 to (+) brake/turn or tail. The load resistor value and wattage are specific to each application to match or approximately match impedance.

Figure 65:
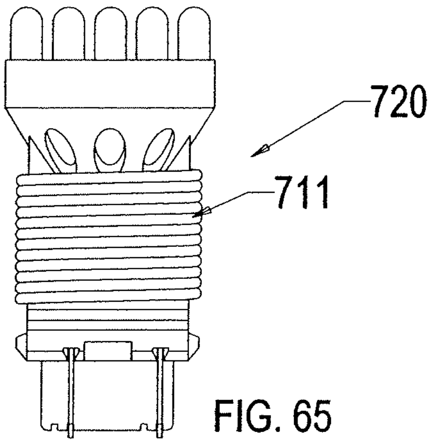

FIG. 65 shows a bulb 720 with a load material 711 wound around a wedge type bulb enclosure made of a material to sustain and insulate heat.

Figure 66:
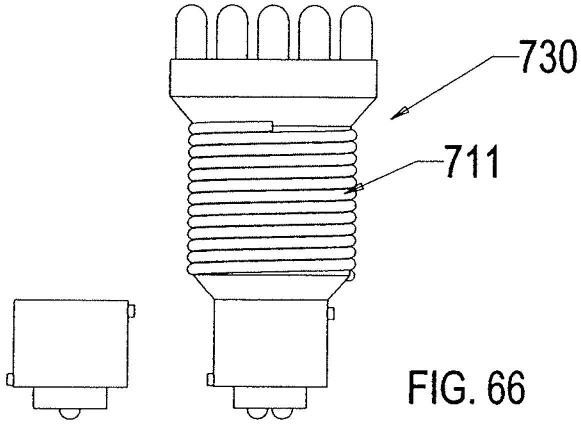

FIG. 66 shows a bulb 730 with a load material 711 wound around a bayonet type bulb enclosure made of a material to sustain and insulate heat. It can have a dual contact as shown on bulb 730, or a single contact as shown on the left.

Figure 67:
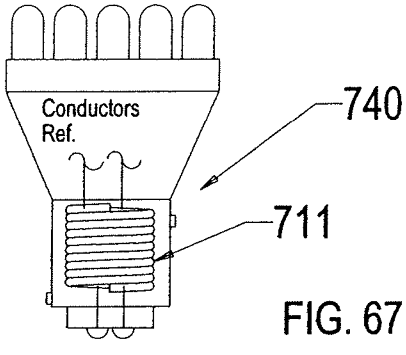

FIG. 67 shows a coil load spool 711 in a metal base, with the (−) end of the coil resistor 711 connected to the metal base and the (+) end of the coil connected to brake/turn. The wire coil is shown in cross section. The spool and coil are shown inside the metal bayonet base. This coil can fit single and dual contact bases.

Figure 68:
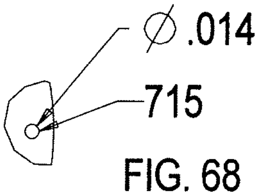
Figure 69:
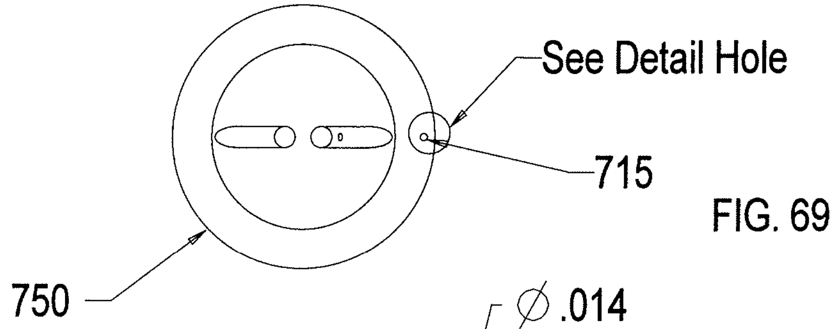

FIG. 68 is a detail of FIG. 69.

FIG. 69 is a drawing of a bottom view of a spool 750.

Figure 70:
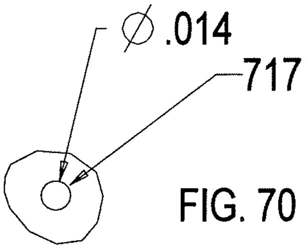
Figure 72:
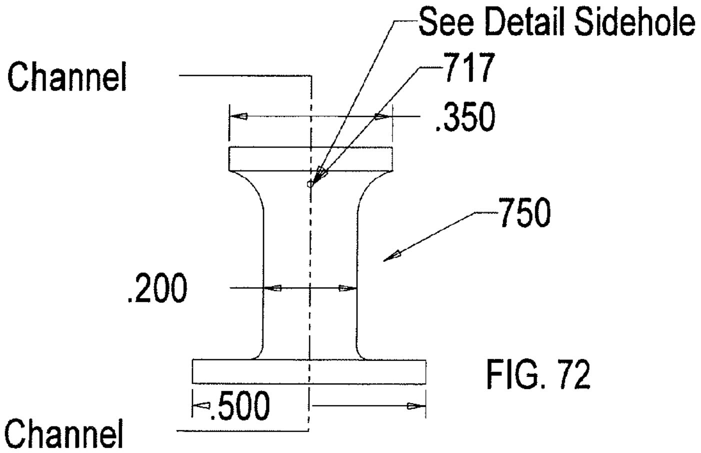

FIG. 70 is a detail of FIG. 72.

Figure 71:
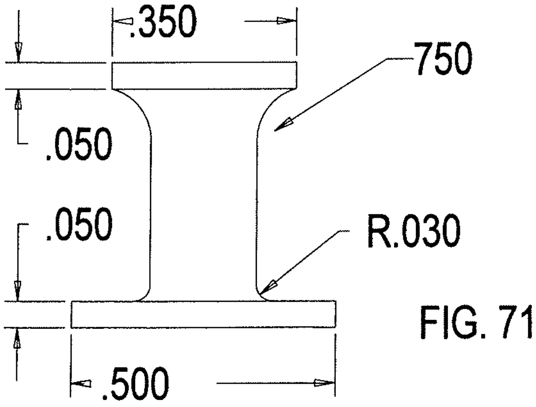

FIG. 71 is a side view of spool 750.

FIG. 72 is a view of spool 750, showing a hole 717 through which a wire connects the (+) brake and tail to the spool wire (the spool wire is not shown in FIGS. 68-74, but is wound on spool 750 as one would normally wind thread on a spool).

Figure 73:
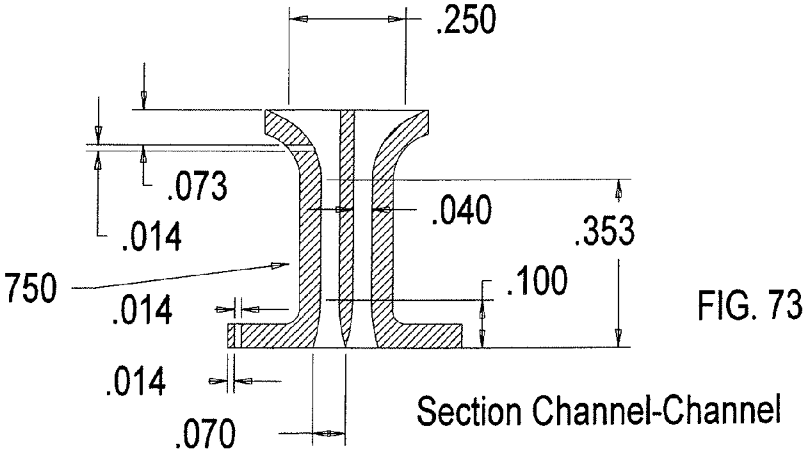

FIG. 73 shows through holes for brake/turn and tail conductors.

Figure 74:
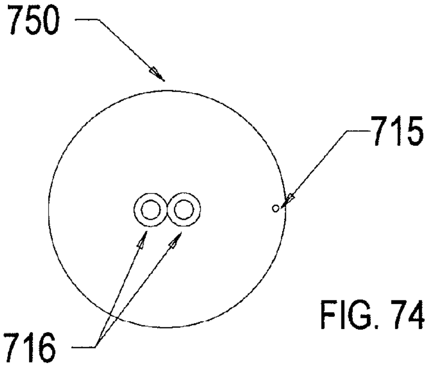

FIG. 74 is a top view of a spool, with a (−) end coil wire hole 715 for connection to a metal base and tapered holes 716 through the spool for brake/turn and tail conductors.

Figure 75:
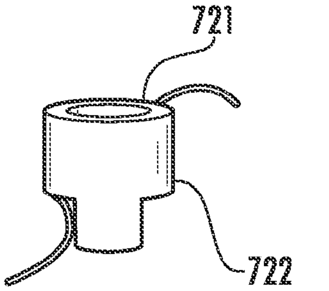
FIG. 75 shows a resistive solid or composite material load in a metal base.

FIG. 75 shows a resistive solid or composite material load 721 in a metal base 722. Base 722 can be used in single and dual contact bayonet type bulbs.

Figure 76:
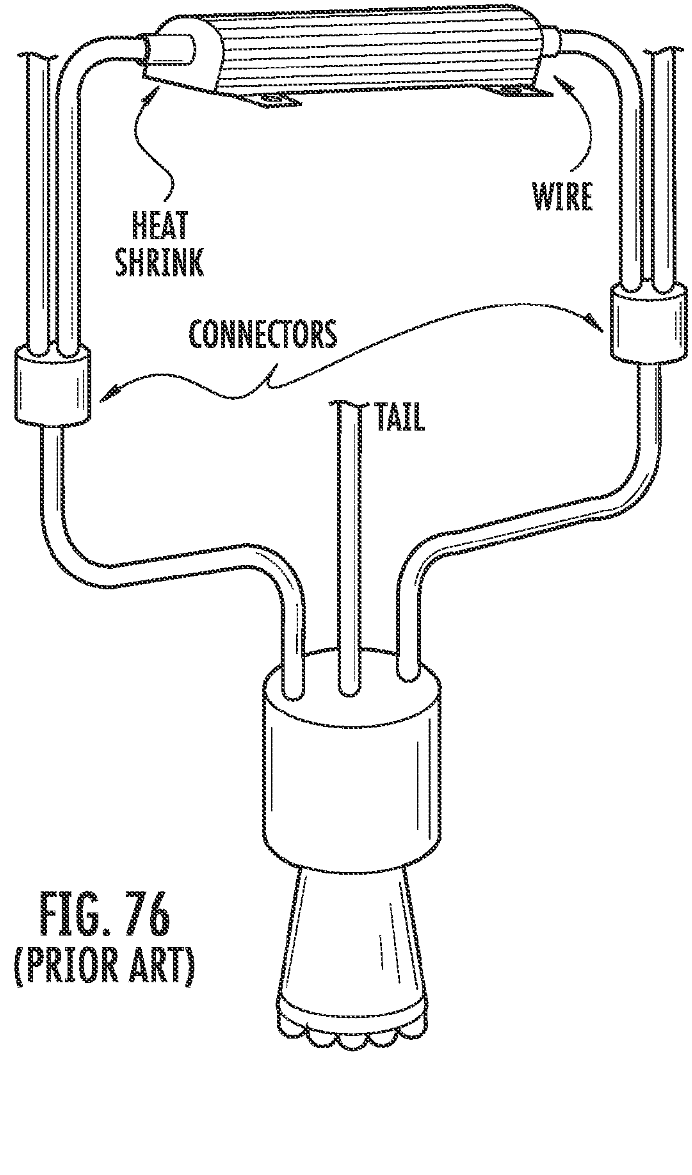
FIG. 76 (PRIOR ART)
FIGS. 76-84 show additional embodiments of the present invention.

FIG. 76 shows a prior art high power resistor connected using heat shrink connectors between brake/tail and ground before a bulb socket. An LED bulb is shown in the socket. The resistor is a metal case wire wound resistor which comes with wires and connectors The resistor, insulators, connectors, and wire may vary. Another prior art system is like what is shown in FIG. 76 but with no tail/running lamp wire.

Figure 77:
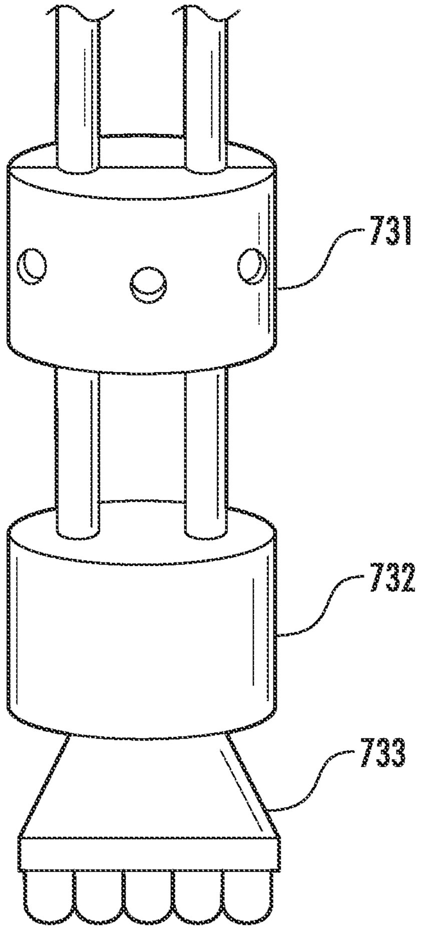

FIG. 77 shows a load coil or composite module 731 connected to both wires before connecting to a wedge or bayonet bulb socket 732. A LED bulb 733 is shown in the socket. There could instead be a three wire configuration.

Figure 78:
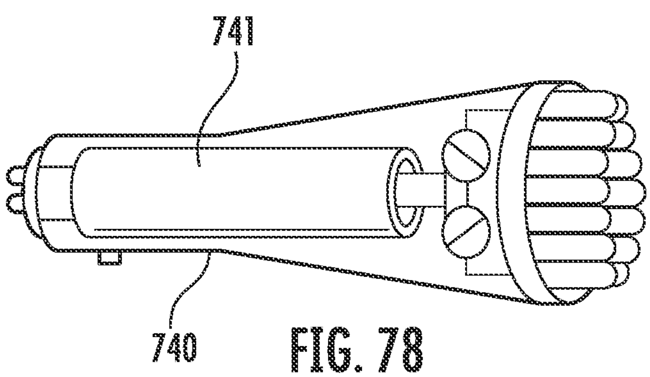

FIG. 78 shows a long load 741 in an LED bulb 740. Load 741 is an internal load which could be composite or a wire-wound coil that extends out of a metal base, and is connected to brake/turn and ground or metal base. Two wires can pass through the load or pass around the load, or one wire can pass through the load and the other pass around the load. This could be made as well in a wedge type (7443 or 3157, etc.) body, connected to brake/turn and ground wires, with no metal base. It can fit both double and single brightness bulbs.

Figure 79:
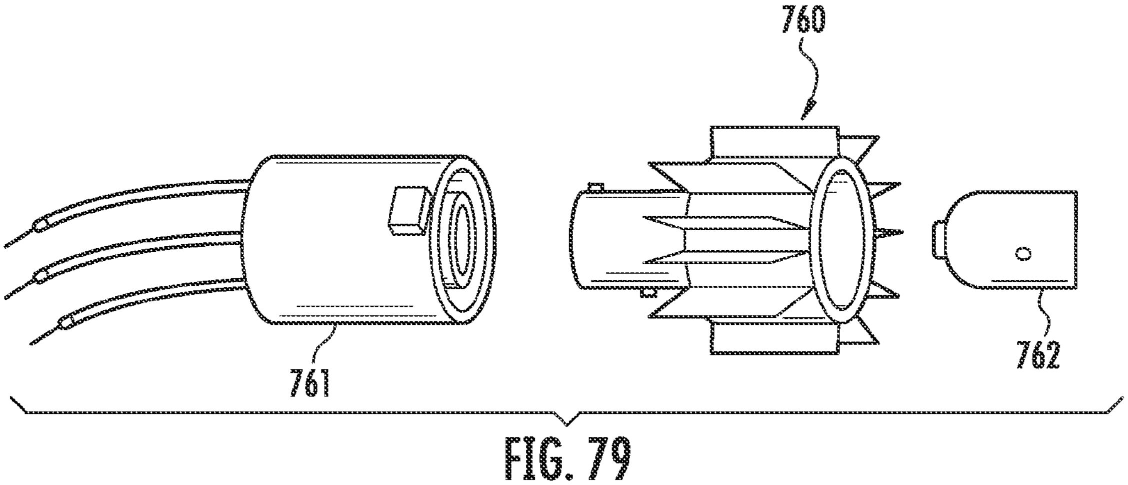

FIG. 79 show an in-line load module 760 which plugs into a standard socket 761 and an LED bulb 762 (of which only the socket is showing) plugs into in-line load module 760. Module 760 can be made of any suitable resistive load or impedance material such as wire, wire coil, composite, metal, carbon, ceramic and so on as required for form, fit, and function. Module 760 is adaptable to all bulb types, models and applications. Module 760 is adaptable to all methods and materials of heat dissipation such as aluminum fins, epoxy, copper, composites, and so forth.

Figure 80:
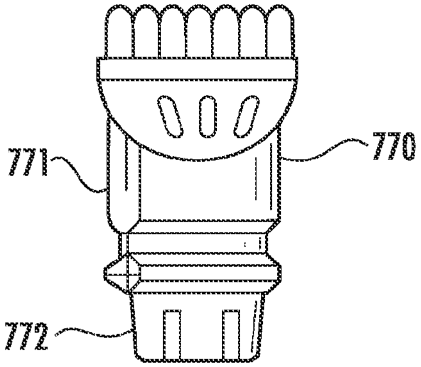

FIG. 80 shows a 3157 body type LED bulb 770 with load material formed into the bulb housing with an insulating base 772 from the conductors for single and dual brightness bulbs with or without a heat sink or other means of heat dissipation of the load or lamps.

Figure 81:
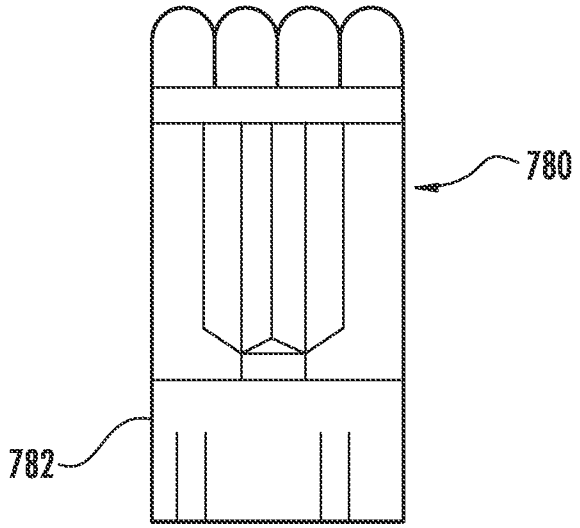

FIG. 81 shows a bulb 780 similar to that of FIG. 80, but can be a 7443, 24, 194, 912 type LED bulb with load material formed into the bulb housing and with an insulating base 782 from the conductors for single and dual brightness bulbs.

Figure 82:
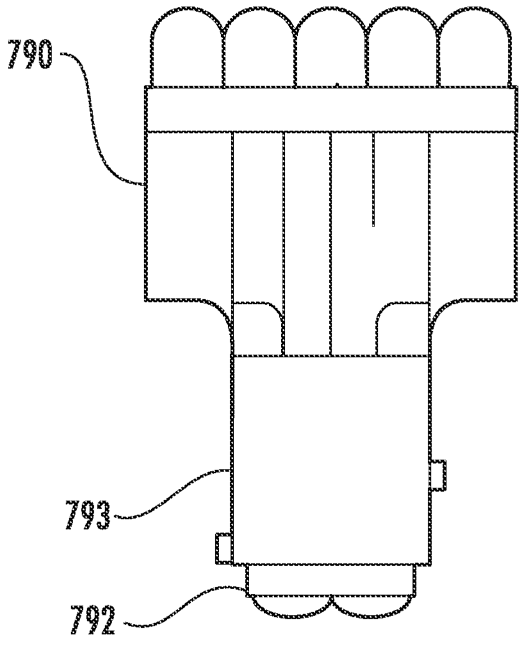

FIG. 82 shows a bulb 790 similar to that of FIG. 80, but for 1157 or 1156 or 1895 bayonet type LED bulbs. Bulb 790 includes a metal base 793 and an insulator 792

In FIGS. 80-82, instead of LED's another light source could be used.

Figure 83:
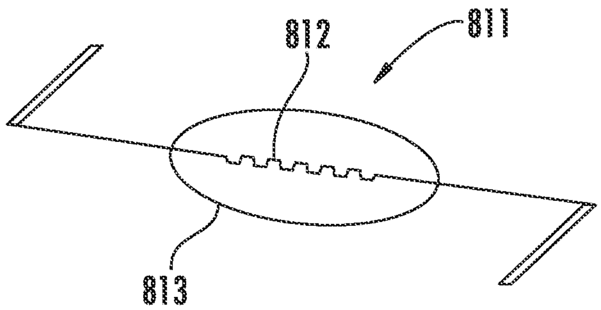
Figure 84:
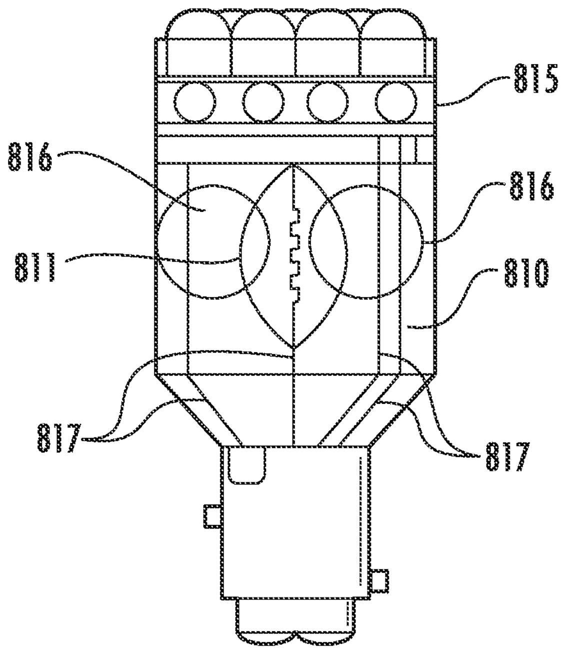

FIGS. 83 and 84 show a hybrid LED/incandescent bulb 810. FIG. 83 shows a vacuum bulb load 811 designed to dissipate the rest of the normal expected load not dissipated by the LEDs. One end of load 811 is connected to (+) brake/turn and the other is connected to ground. The teachings of bulb 810 are adaptable to all currently known and currently unknown bulb types.

In bulb 810, an incandescent lamp filament 812 provides a load in a glass vacuum 813. Filament 812 can either illuminate or not as desired. This type would preferably have a heat shield or dissipation or vent to protect sensitive electrical and mechanical components. Vacuum bulb load 811 optionally mounts within bulb or lamp 810 or outside as desired. An illuminating type load 811 would add to the overall brightness of the bulb 810.

FIG. 84 shows vent holes 815 adjacent the LEDs and larger vent holes 816 adjacent load 811. Wires 817 connect to ground, brake/turn, and tail. The housing material is preferably able to withstand the high temperatures which will be generated by the LEDs and the load 811.

Instead of glass vacuum 813, one could use a different material (and a different material for filament 812 as well. Vacuum 813 could be gas charged either under vacuum or pressure.

Light mixtures of any colors. Viewing angles of various degrees up to 360° possible. The heat shield could be made of a number of materials including vacuum, metals, ceramic, polymers, composites, glass, fiberglass, Gortex, water, chemicals, and so forth. Vibration damping would optionally be provided for as required for avoiding failure due to vibration damage.

Figure 85:
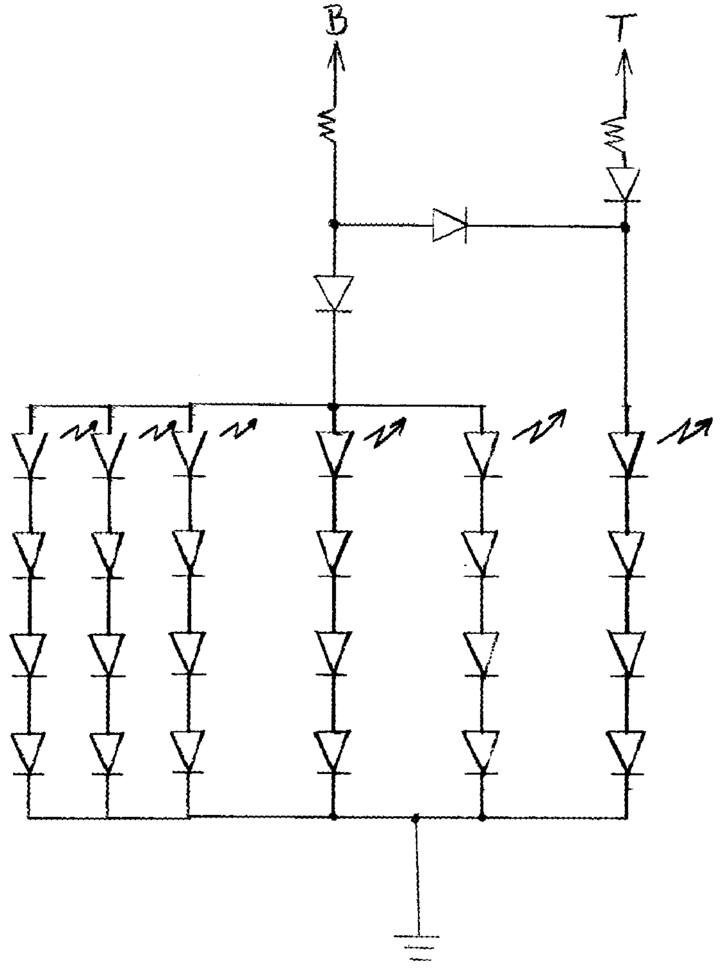
FIGS. 85-96 show circuit diagrams of additional embodiments of the present invention

FIG. 85 shows an LED lamp or bulb circuit which incorporates 4 of 24 LEDs for use as tail light mode and 24 of 24 LEDs for use as brake light mode. This is accomplished using proper resistors and diodes placed at the inputs of brake and tail and one diode between brake and tail inputs. The LEDs are arranged in 6 parallel branches of 4 series LEDs.

Figure 86:
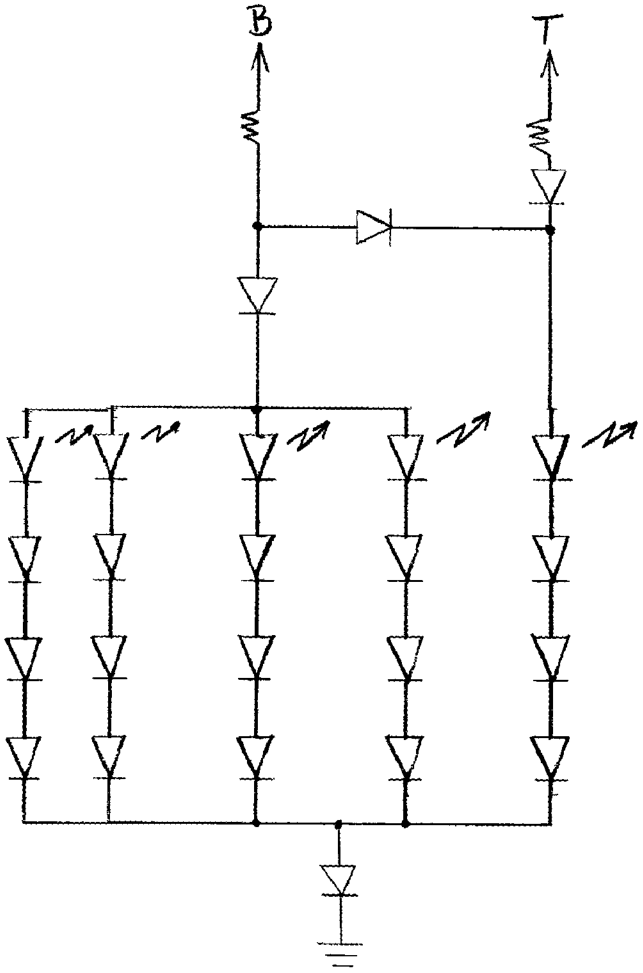

FIG. 86 shows an LED lamp or bulb circuit which incorporates 4 of 20 LEDs for use as tail light mode and 20 of 20 LEDs for use as brake light mode. This is accomplished using proper resistors and diodes placed at the inputs of brake and tail and one diode placed between brake and tail inputs with one diode placed between the LEDs and ground. The LEDs are arranged in 5 parallel branches of 4 series LEDs.

Figure 87:
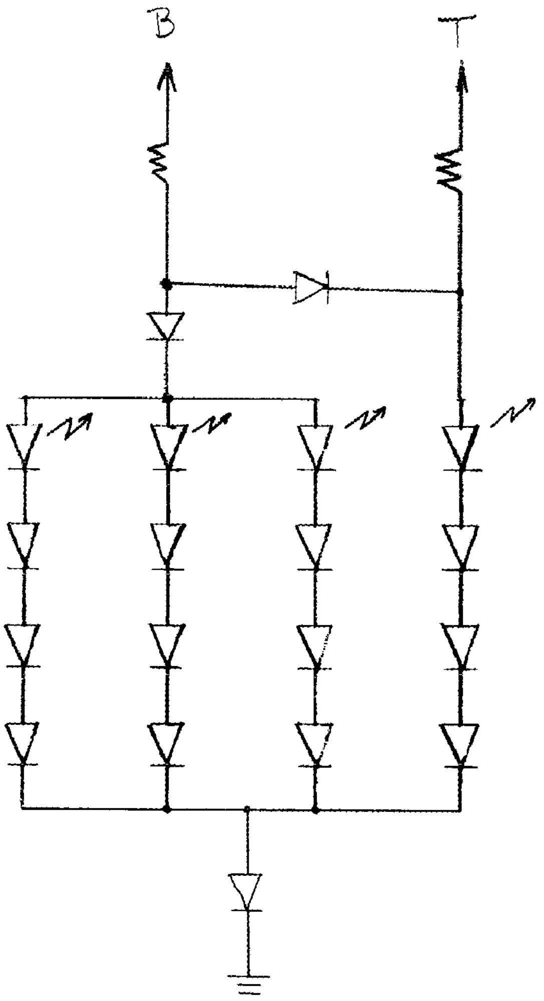

FIG. 87 shows an LED lamp or bulb circuit which incorporates 4 of 16 LEDs for use as tail light mode and 16 of 16 LEDs for use as brake light mode. This is accomplished using a proper resistor and diode placed at the input of brake and proper resistor placed at the input of tail and one diode placed between brake and tail inputs and one diode placed between LEDs and ground. The LEDs are arranged in 4 parallel branches of 4 series LEDs.

Figure 88:
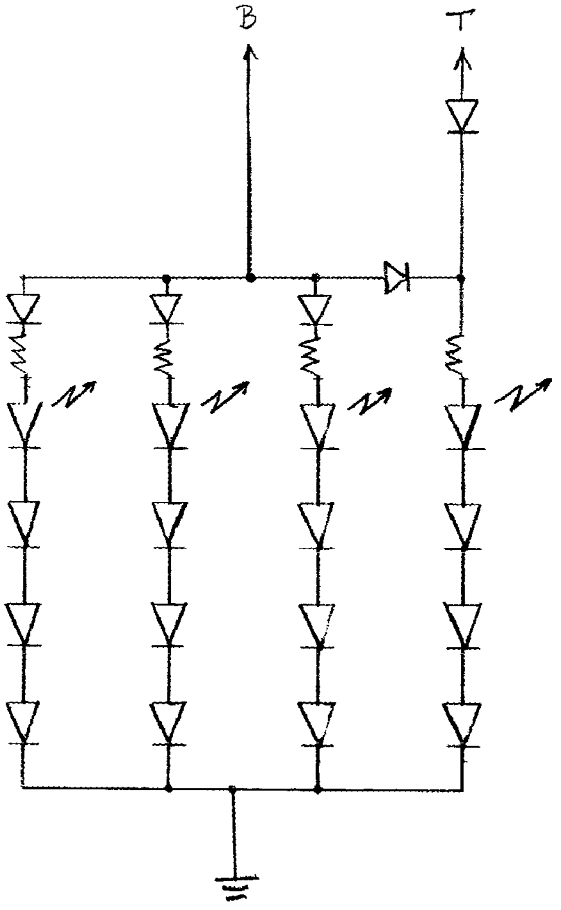

FIG. 88 shows an LED lamp or bulb circuit which incorporates 4 of 16 LEDs for use as tail light mode and 16 of 16 LEDs for use as brake light mode. This is accomplished using proper series resistors and diodes placed at the input of each of the 4 parallel strings of the 4 series LEDs with one diode placed between the third and fourth string of LEDs and another diode placed at the input of tail.

Figure 89:
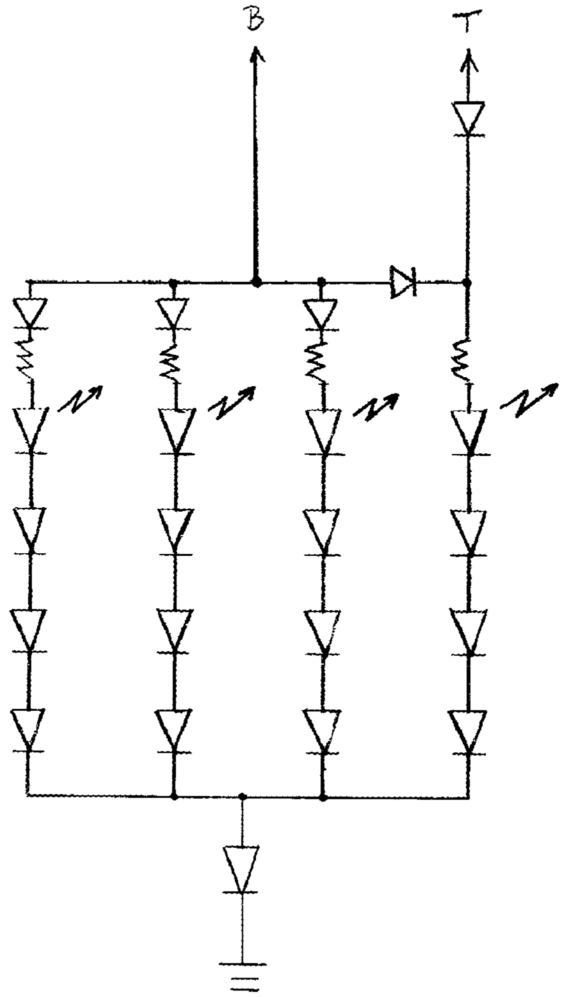

FIG. 89 shows an LED lamp or bulb circuit which incorporates 4 of 16 LEDs for use as tail light mode and 16 of 16 LEDs for use as brake light mode. This is accomplished using proper series resistors and diodes placed at the input of each of the 4 parallel strings of 4 series LEDs with one diode placed between the third and fourth string of LEDs and another diode placed at the input of tail and another diode placed between the LEDs and ground.

Figure 90:
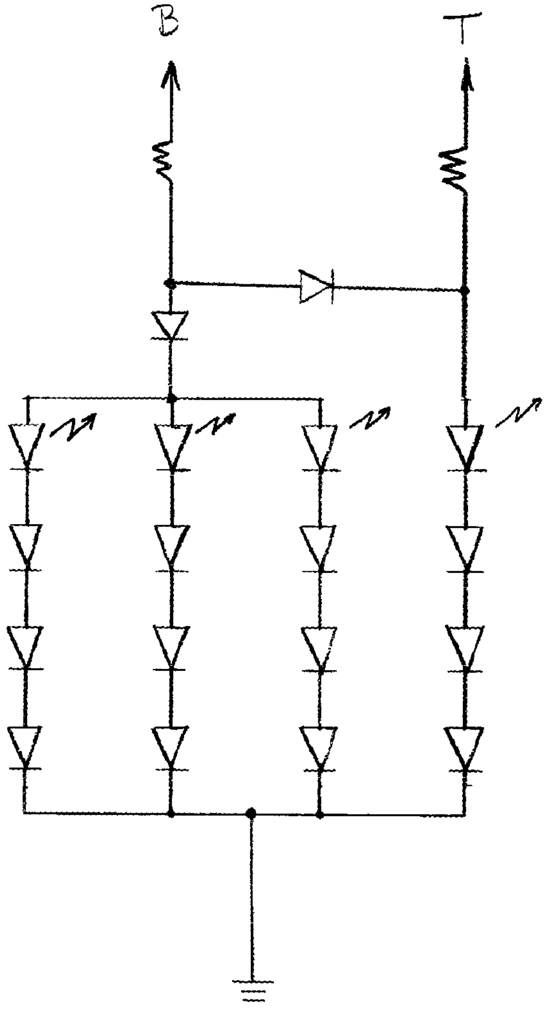
Figure 91:
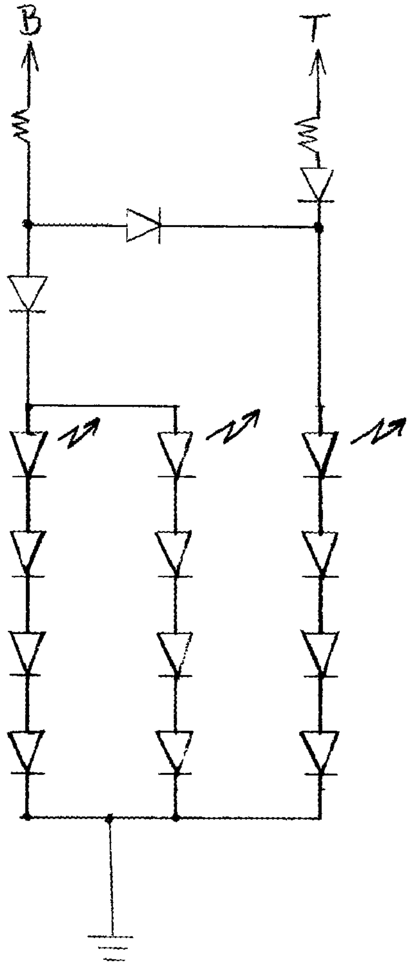
Figure 92:
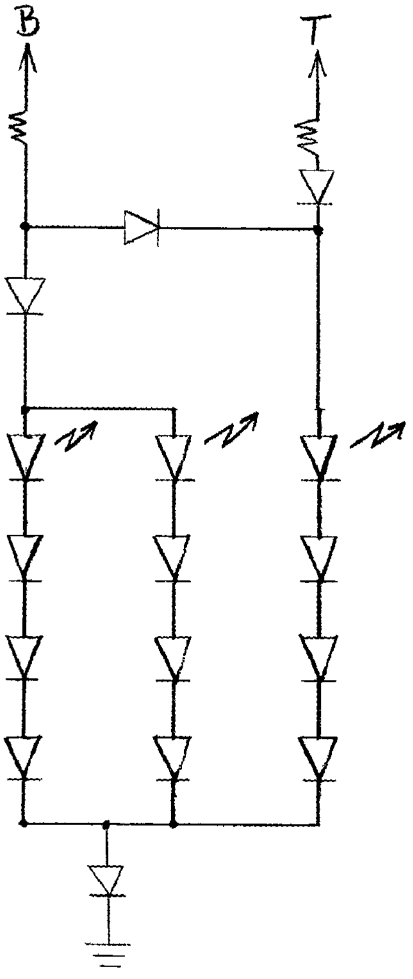
Figure 93:
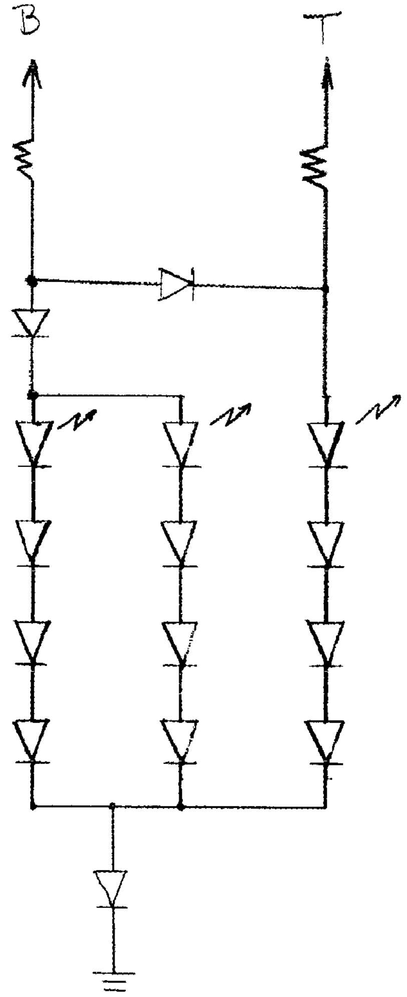
Figure 94:
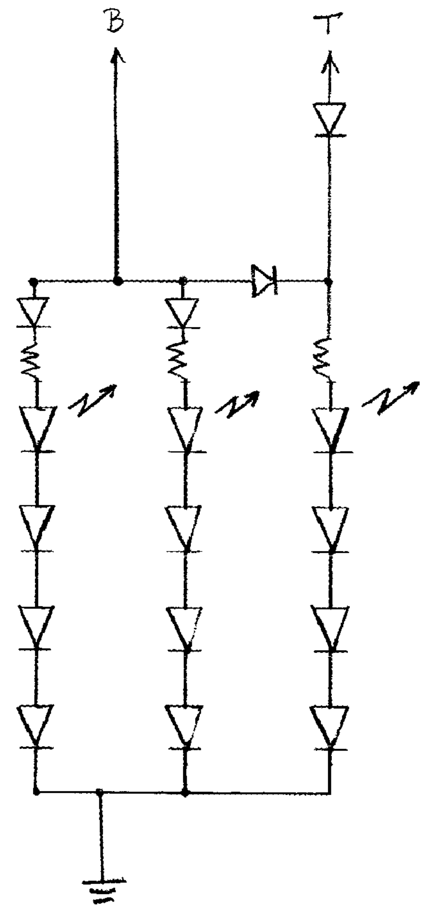
Figure 95:
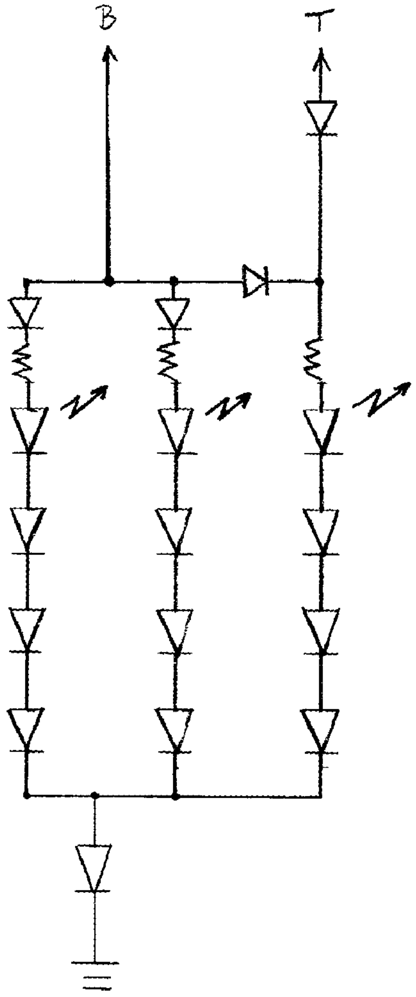
Figure 96:
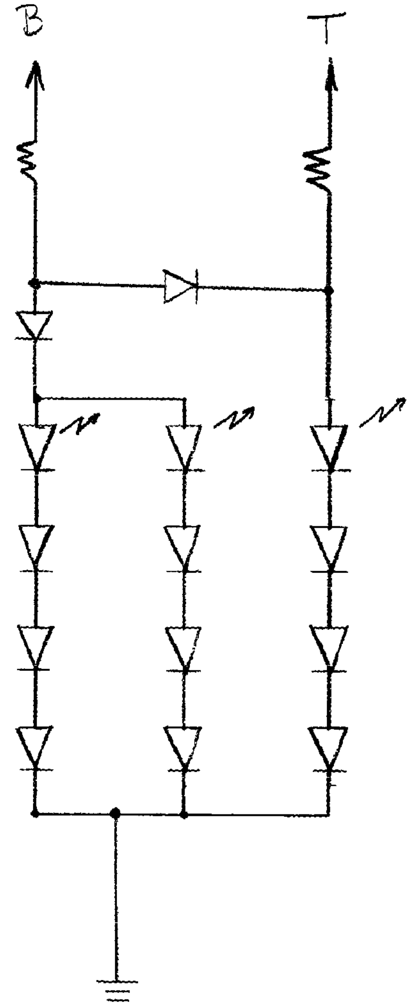

FIG. 90 shows an LED lamp or bulb circuit which incorporates 4 of 16 LEDs for use as tail light mode and 16 of 16 LEDs for use as brake light mode. This is accomplished using a proper series resistor and diode placed in the brake input and a diode placed between brake and tail inputs and a proper resistor placed in the tail input. The LEDs are arranged in 4 parallel branches of 4 series LEDs.

FIGS. 91-96 are similar to FIGS. 85-90, and show LED lamp or bulb circuits which incorporate 4 of 12 LEDs for use as tail light mode and 12 of 12 LEDs for use as brake light mode.

While 24, 20, 16, or 12 LEDs total are shown in the circuits of FIGS. 85-96, other numbers could be used, such as for example 2, 20, 32, 48, 56, 60, 64, 68, or even 100 or more (if the LEDs are small enough).

Also, 24, 20, 16, or 12 LEDs total can be used in any of the circuits of FIGS. 85-96.

Preferably, anywhere from 15-60% of the LEDs can be used for tail, and typically 100% used for brake. More preferably, are 20-33% of the LEDs can be used for tail, and typically 100% used for brake. It is the inventor's understanding that with today's SAE standards, tail should be ⅕ of brake brightness, but that could change. So, even more preferably, about ⅕ of the LEDs can be used for tail, and typically 100% used for brake. However, if LEDs of different brightness or viewing angles are used, or they are arranged at different angles or positions, one could achieve any desired intensity difference for tail and brake without necessarily varying the number of LEDs for brake and tail as discussed above. For example one could have 50% of the LEDs for tail, and all for brake, but the tail light intensity could be ⅕ of the brake light intensity if the LEDs used for tail are sufficiently dim and the LEDs used only for brake are sufficiently bright.

LED Automotive Bulbs

The following information can be found at www.jamstrait-.com. The information at that web site, and all LED bulbs sold by Jam Strait, Inc. as of 15 Apr. 2002, are incorporated herein by reference.

Applications: Designed to replace the existing incandescent brake/tail light and turn signal bulbs in most cars, trucks, busses, motorcycles and trailers to upgrade to LED lights.

Advantages and Improvements over incandescent bulbs:

1.) Lifetime Limited Warranty*
2.) More Reliable 5,000% **
3.) Faster 98%**
4.) Cooler 96.54%**
5.) More Energy Efficient 96.54%**
6.) More Focused 91-98%**
7.) Water Safe (Boat trailers) 100% even powered up.

SPECIFICATIONS 1156, 1157-SR, and 3157-SR

15 Water-clear Super Bright Red LEDs.

Brightness control circuitry for maximum brightness and reliability over 11-14 Vdc operating range.

Integrated dual element control circuitry operates all LEDs for both tail and brake for maximum brake brightness in 1157-SR bulbs.

Total current is 90 mA at 13.8 Vdc-Versus-2.6 A for incandescent.

2× oversize metal oxide resistors.

Response is near instantaneous-Versus-200 milliseconds for incandescent.

Installs in existing OEM socket like the existing incandescent bulb it replaces.

No lamp modifications are required in most applications.

Also available in green and blue for off-road use only.

30 degree beam.

The bulbs require an inexpensive variable load flasher for turn signal use—most vehicles come with this flasher; the flasher can be purchased and installed in those that do not.

*Limited to the replacement of blown bulb from original owner. Non-transferable. Owner pays shipping and handling.

**Calculated/Measured

Wedge Base 4 digit Automotive

Replaces the following incandescent bulbs with no modifications:

3056, 3057, 3156, 3157, 3356, 3357, and 3457 bulbs per the "Application Guide." Also replaces Japanese 7443 and 7440 in Hondas per the "Honda Application Guide."

3157-HR Hyper-Bright RED
7 cd HP chip LEDs 630 nm 15 LED
Visual Test Results: BLINDING
Recommended for: All Red Lenses.
May Be to bright for clears lenses.

3157-HA Hyper-Bright Amber
7 cd HP chip 590 nm 15 LED
Visual Test Results: BLINDING
Recommended for: All Amber Lenses
May be to bright for clear lenses.

3157-SR Super-Bright Red
30° Viewing Angle 15 LED
Visual Test Results: Very Bright
Recommended for: All Clear Lenses and newer Red lenses 3157-SA Super-Bright Amber
30° Viewing Angle 15 LED
Visual Test Results: Very Bright
Recommended for: All Clear Lenses and newer Amber lenses 3157-SG Super-Bright Green
30° Viewing Angle 12 LED
Visual Test Results: Very Bright
Recommended for: Show Use Only 3157-SB Super-Bright Blue
30° Viewing Angle 12 LED
Visual Test Results: Bright
Recommended for: Show Use Only 3157-SW Super-Bright White
12 LED Bright Narrow Angle
Visual Test Results: Not nearly as bright as HR & HA bulbs behind tinted lenses Twist Metal Base 4 digit automotive Dual Element LED Bulbs replace the following incandescent bulbs with no modification: 1157, 1154, 1034, 2057, 2357, 2397, 3496, and 7528.

1157-HR Hyper-Bright Red
7 cd HP chip LEDs 630 nm 15 LED
Visual Test Results: BLINDING
Recommended for: All Red Lenses.
May Be to bright for clears lenses.
1157-HA Hyper-Bright Amber
7 cd HP chip 590 nm 15 LED
Visual Test Results: BLINDING
Recommended for: All Amber Lenses
May be to bright for clear lenses.
1157-SR Super-Bright Red
30° Viewing Angle 15 LED
Visual Test Results: Very Bright
Recommended for: All Clear Lenses and newer Red lenses
1157-SA Super-Bright Amber
30° Viewing Angle 15 LED
Visual Test Results: Very Bright
Recommended for: All Clear Lenses and newer Amber lenses
1157-SG Super-Bright Green
30° Viewing Angle 12 LED
Visual Test Results: Very Bright
Recommended for: Show Use Only
1157-SB Super-Bright Blue
30° Viewing Angle 12 LED
Visual Test Results: Bright
Recommended for: Show Use Only
1157-SW Super-Bright White
12 LED Bright Narrow Angle
Visual Test Results: Not nearly as bright as HR & HA bulbs behind tinted lenses
Single Element LED
Bulbs replace the following incandescent bulbs with no modifications: 1156, 1073, 1141, 3497, 7506, 5007 and 5008
1156-HR Hyper-Bright Red
30° Viewing Angle 15 LED
Visual Test Results: Very Bright
Recommended for: All Clear Lenses and newer Red lenses
1156-HA Hyper-Bright Amber
7 cd HP chip 590 nm 15 LED
Visual Test Results: BLINDING
Recommended for: All Amber Lenses
May be to bright for clear lenses.
1156-SRL Super-Bright Red
30° Viewing Angle 15 LED
Visual Test Results: Very Bright
Recommended for: All Clear Lenses and newer Red lenses
1156-SA Super-Bright Amber
30° Viewing Angle 15 LED
Visual Test Results: Very Bright
Recommended for: All Clear Lenses and newer Amber lenses
1156-SG Super-Bright Green
30° Viewing Angle 12 LED
Visual Test Results: Very Bright
Recommended for: Show Use Only
1156-SB Super-Bright Blue
30° Viewing Angle 12 LED
Visual Test Results: Bright
Recommended for: Show Use Only
1156-SW Super-Bright White
12 LED Bright Narrow Angle
Visual Test Results: Not nearly as bright as HR & HA bulbs behind tinted lenses
3157-HRCK Hyper-Bright Red
7 cd HP chip LEDs 630 nm 15 LED
Visual Test Results: BLINDING
Recommended for: All Red Lenses.
May Be too bright for clear lenses.
Special Application Bulb
See Application Guide
3157-SRCK Super-Bright Red
30° Viewing Angle 15 LED
Visual Test Results: Very Bright
Recommended for: All Clear Lenses and newer Red lenses
Special Application Bulb
See Application Guide
3157-SGCK Super-Bright Green
30° Viewing Angle 12 LED
Visual Test Results: Very Bright
Recommended for: Show Use Only
Special Application Bulb
See Application Guide
3157-SBCK Super-Bright Blue
30° Viewing Angle 12 LED
Visual Test Results: Bright
Recommended for: Show Use Only
Special Application Bulb
See Application Guide
3157-SWCK Super-Bright White
12 LED Bright Narrow Angle
Visual Test Results: Not nearly as bright as HR & HA bulbs behind tinted lenses
Special Application Bulb
See Application Guide
8898-SR Super-Bright Red
Trick wired LED Bulbs for 88-98 full size Chevy and GMC Trucks.
Makes tail lamp function as brake and turn. Also doubles brightness, Visibility and coolness.
2 sets required
8898-HR Hyper-Bright Red
Trick wired LED Bulbs for 88-98 full size Chevy and GMC Trucks.
Makes tail lamp function as brake and turn.
Also doubles brightness, Visibility and coolness.
2 sets required
Variable Load Turn Signal Flashers for any vehicle
Mini 3 Digit Wedge LED Bulbs
4 LEDs
194-HR Hyper-Bright Red
194-HA Hyper-Bright Amber
194-HG Hyper-Bright Green
194-HB Hyper-Bright Blue
194-SW Super-Bright White
Aluminum Power Resistors
(with pigtails and squeeze connectors) Install across wires to LED Bulbs Brake/Tail for connecting computer or turn signal problems in any vehicle LED Bulbs Application Guide 3157 LED Bulbs:
Replaces all 3058, 3156, 3356, 3456 and 3457 bulbs. Replaces all 3057, 3157 and 3357 bulbs EXCEPT those requiring the 88-99 series bulbs.
3157-XXCK LED Bulbs:
88-99 (old style) full size Chevy and GMC trucks CENTER rear Brake/Tail/Turn lamps. (Top Tail Lamp requires the 3157-SR series LED Bulb)
95-01 Cavalier and Sunfire Brake/Tail/Turn Lamps.
92-98 Grand Am Brake/Tail/Turn lamps.
1157-SRUSA/HR/HA/HG/HB/SW LED Bulbs:
Replaces all 1157, 1154, 1034, 2057, 2357, 2397, 3496 and 7528 bulbs.

1156-SA/HA/SRL/HR/HG/HB/SW LED Bulbs:

Replaces all 1156, 1073, 1141, 3497, 7506, 5007 and 5008 bulbs.

194-HR, HA, HG, HB, SW:

Replaces all 3digit Automotive Bulbs. One can find out what bulbs his vehicle takes at http://www.sylvania.com/auto/carapp/

LED Bulb Application Guide for Hondas

The 3157 series LED bulbs will also replace the Japanese type 7443 and 7440 bulbs in Honda Civics and Accords if minor modifications are made to the LED bulbs' plastic housing per drawings found at www.jamstrait.com and/or in the packaging for these bulbs.

Applicable Drawings by Part Number and Corresponding Incandescent Bulb Numbers

| LED Bulb | FIG. Nos. | Corresponding incandescent bulb nos. |
|---|---|---|
| 194-XX | 33-42 | Replaces all 3 digit Automotive Incandescent Bulbs |
| 1156-XX | 1, 3, 5, 6, 10-17, 29-32, 60, 61 | 1156, 1073, 1141, 3497, 7506, 5007, and 5008 |
| 1157-XX | 1, 2, 4-18, 29-32, 43, 57 | 1157, 1154, 1034, 2057, 2357, 2397, 3496, and 7528 |
| 3157-XX | 5, 9-17, 19, 21, 23-32, 43-47, 50-52, 54-56 | 3056, 3156, 3356, 3456, 3457, 3057, 3157, and 3357 |
| 3157-XXCK | 5, 9-17, 19, 21, 23-32, 43-47, 48-51, 53 | 3057, 3157, and 3357 in 88-98 Chevy Truck center brake socket, 95-01 Cavalier and Sunfire Brake, and 92-98 Grand Am Brake |

XX = R, SR, SRL, HR, A, SA, HA, B, SB, HB, G, SG, HG, Y, SY, HY, W, SW, HW.

More information about the present invention can be found at wwwjamstrait.com.

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. An LED light bulb adapted for use in standard automotive bayonet type bulb sockets in a brake light mode and a tail light mode, comprising:
- a printed circuit board;
- at least one light emitting diode mounted on the printed circuit board and electrically coupled with the printed circuit board;
- a body having a first end and a second end, with the printed circuit board attached to the first end of the body;
- a base having a sidewall, a distal end and a proximal end, the sidewall having two alignment pins thereon, the distal end having at least one contact; and
- electrical control circuitry electrically connected between first and second contacts on the base and the printed circuit board, whereby when an electrical signal is supplied to the contacts the electrical control circuitry transmits a processed electrical current enabling the at least one light emitting diode to be energized and emit light, wherein the electrical control circuitry causes the at least one light emitting diode to illuminate when used in both the tail light mode and the brake light mode, and causes the brake light mode to be brighter than tail light mode.

2. An LED light bulb as in claim 1 wherein the body contains a plurality of cooling holes.

3. An LED light bulb as in claim 1 wherein the electrical control circuitry comprises a resistor.

4. An LED light bulb as in claim 1 wherein electrical control circuitry comprising a resistor electrically connected between the first contact and the printed circuit board and a resistor-diode series combination electrically connected between the second contact and printed circuit board.

5. An LED light bulb adapted for use in a standard automotive wedge type bulb socket in a brake light mode and a tail light mode, comprising:
- a printed circuit board;
  - at least one light emitting diode mounted on the printed circuit board and electrically coupled with the printed circuit board;
  - a body having a first end and a second end, the second end terminating in a wedge shaped portion;
  - electrical control circuitry electrically connected between the printed circuit board and at least one pair of electrical conductors, whereby when an electrical signal is supplied to the socket the electrical control circuitry transmits a processed electrical current enabling the at least one light emitting diode to be energized and emit light, wherein the at least one light emitting diode illuminates when used in both the tail lamp mode and the brake lamp mode, and brake lamp mode is brighter than tail lamp mode.

6. An LED light bulb as in claim 5 wherein the electrical control circuitry comprises a resistor.

7. An LED light bulb as in claim 5 wherein the body contains a plurality of cooling holes.

8. An LED light bulb as in claim 5 wherein the bulb has first and second contacts, and the electrical control circuitry comprises a resistor electrically connected between the first contact and the printed circuit board and a resistor-diode series combination electrically connected between the second contact and printed circuit board.

9. An LED light bulb adapted for use in standard automotive bulb sockets in a brake light mode and a tail light mode, comprising:
- a printed circuit board;
- at least one light emitting diode mounted on the printed circuit board and electrically coupled with the printed circuit board;
- a body having a first end and a second end, with the printed circuit board attached adjacent the first end of the body;
- first and second contacts; and
- electrical control circuitry electrically connected between the first and second contacts and the printed circuit board, whereby when an electrical signal is supplied to the contacts the electrical control circuitry transmits a processed electrical current enabling the at least one light emitting diode to be energized and emit light, wherein the electrical control circuitry causes the at least one light emitting diode to illuminate when used in both the tail lamp mode and the brake lamp mode, and causes the brake lamp mode to be brighter than tail lamp mode.

10. An LED light bulb as in claim 9 wherein the body contains a plurality of cooling holes.

11. An LED light bulb as in claim 9 wherein the electrical control circuitry comprises a resistor.

12. An LED light bulb as in claim 9 wherein electrical control circuitry comprising a resistor electrically connected between the first contact and the printed circuit board and a resistor-diode series combination electrically connected between the second contact and printed circuit board.

13. An LED light bulb adapted for use in standard automotive bayonet type bulb sockets in a brake light mode and a tail light mode as a replacement for a standard incandescent bulb in a vehicle, the LED light bulb comprising:

a printed circuit board;

a plurality of light emitting diodes mounted on the printed circuit board and electrically coupled with the printed circuit board;

a body having a first end and a second end, with the printed circuit board attached to the first end of the body;

a base having a sidewall, a distal end and a proximal end, the sidewall having two alignment pins thereon, the distal end having at least one contact;

electrical control means electrically connected between first and second contacts on the base and the printed circuit board, whereby when an electrical signal is supplied to the contacts the electrical control means transmits a processed electrical current enabling the light emitting diodes to be energized and emit light, wherein the electrical control means causes at least some light emitting diodes to illuminate when used in both the tail light mode and the brake light mode, and causes the brake light mode to be brighter than tail light mode; and electrical resistance to cause the LED bulb to have similar or the same resistance or impedance as a standard incandescent bulb which would fit the standard automotive bayonet type bulb sockets to allow the LED bulb to replace the standard incandescent bulb without causing malfunctioning of a vehicle in which the LED bulb is used.

14. An LED light bulb as in claim 13 wherein the body contains a plurality of cooling holes.

15. An LED light bulb as in claim 13 wherein the electrical control means comprises a resistor.

16. An LED light bulb as in claim 13 wherein electrical control means comprising a resistor electrically connected between the first contact and the printed circuit board and a resistor-diode series combination electrically connected between the second contact and printed circuit board.

17. An LED light bulb adapted for use in a standard automotive wedge type bulb socket in a brake light mode and a tail light mode as a replacement for a standard incandescent bulb, the LED light bulb comprising:

a printed circuit board;

a plurality of light emitting diodes mounted on the printed circuit board and electrically coupled with the printed circuit board;

a body having a first end and a second end, the second end terminating in a wedge shaped portion;

electrical control means electrically connected between the printed circuit board and at least one pair of electrical conductors, whereby when an electrical signal is supplied to the socket the electrical control means transmits a processed electrical current enabling the light emitting diodes to be energized and emit light, wherein at least some of the light emitting diodes illuminate when used in both the tail lamp mode and the brake lamp mode, and brake lamp mode is brighter than tail lamp mode; and electrical resistance to cause the LED bulb to have similar or the same resistance or impedance as a standard incandescent bulb which would fit the standard automotive wedge type bulb sockets to allow the LED bulb to replace the standard incandescent bulb without causing malfunctioning of a vehicle in which the LED bulb is used.

18. An LED light bulb as in claim 17 wherein the electrical control means comprises a resistor.

19. An LED light bulb as in claim 17 wherein the body contains a plurality of cooling holes.

20. An LED light bulb as in claim 17 wherein the bulb has first and second contacts, and the electrical control means comprises a resistor electrically connected between the first contact and the printed circuit board and a resistor-diode series combination electrically connected between the second contact and printed circuit board.

21. An LED light bulb adapted for use in standard automotive bulb sockets in a brake light mode and a tail light mode as a replacement for a standard incandescent bulb in a vehicle, the LED light bulb comprising:

a printed circuit board;

a plurality of light emitting diodes mounted on the printed circuit board and electrically coupled with the printed circuit board;

a body having a first end and a second end, with the printed circuit board attached adjacent the first end of the body; first and second contacts; and electrical control means electrically connected between first and second contacts and the printed circuit board, whereby when an electrical signal is supplied to the contacts the electrical control means transmits a processed electrical current enabling the light emitting diodes to be energized and emit light, wherein the electrical control means causes at least some light emitting diodes to illuminate when used in both the tail lamp mode and the brake lamp mode, and causes the brake lamp mode to be brighter than tail lamp mode; and electrical resistance to cause the LED bulb to have similar or the same resistance or impedance as a standard incandescent bulb which would fit the standard automotive bulb sockets to allow the LED bulb to replace the standard incandescent bulb without causing malfunctioning of a vehicle in which the LED bulb is used.

22. An LED light bulb as in claim 21 wherein the body contains a plurality of cooling holes.

23. An LED light bulb as in claim 21 wherein the electrical control means comprises a resistor.

24. An LED light bulb as in claim 21 wherein electrical control means comprising a resistor electrically connected between the first contact and the printed circuit board and a resistor-diode series combination electrically connected between the second contact and printed circuit board.

25. An LED light bulb as in claim 21 wherein the resistance is in a module detachable from the bulb.

26. An LED light bulb as in claim 21 wherein the resistance is in the body of the bulb.

27. An LED light bulb adapted for use in standard automotive bulb sockets, comprising:

a printed circuit board;

at least one light emitting diode mounted on the printed circuit board and electrically coupled with the printed circuit board;

a body having a first end and a second end, with the printed circuit board attached to the body;

a base having a distal end and a proximal end, the distal end having at least one contact; and electrical control means electrically connected between first and second contacts on the base and the printed circuit board, whereby when an electrical signal is supplied to the contacts the electrical control means transmits a processed electrical current enabling the at least one light emitting diode to be energized and emit light, and including at least one of the following features:

(a) the printed circuit board acts as heat sink because much of its surface area is metal plated;

(b) when there are multiple light emitting diodes, a jumper is provided which electrically connects at least some of the light emitting diodes in parallel so one light emitting diode can fail without causing all light emitting diodes in series with it to fail;

(c) the printed circuit board acts as a body for the bulb;

(d) multiple diodes are provided to make the bulb non-polarized;

(e) the at least one light emitting diode's intensity is greater when in brake lamp mode than when in tail lamp mode;

(f) electrical control means are provided which comprises means for producing a series of electrical pulses and applying the electrical pulses to the printed circuit board when an electrical signal is applied to the bulb; and (g) the bulb is shaped to fit into recessed sockets in automobiles.

28. An LED light bulb as in claim 27 wherein the printed circuit board acts as heat sink because much of its surface area is metal plated.

29. An LED light bulb as in claim 27 wherein when there are multiple light emitting diodes, a jumper is provided which electrically connects at least some of the light emitting diodes in parallel so one light emitting diode can fail without causing all light emitting diodes in series with it to fail.

30. An LED light bulb as in claim 27 wherein the printed circuit board acts as a body for the bulb.

31. An LED light bulb as in claim 27 wherein multiple diodes are provided to make the bulb non-polarized.

32. An LED light bulb as in claim 27 wherein the at least one light emitting diode's intensity is greater when in brake lamp mode than when in tail lamp mode.

33. An LED light bulb as in claim 27 wherein electrical control means are provided which comprises means for producing a series of electrical pulses and applying the electrical pulses to the printed circuit board when an electrical signal is applied to the bulb.

34. An LED light bulb as in claim 27 wherein the body contains a plurality of cooling holes.

35. An LED light bulb as in claim 27 wherein the at least one light emitting diode's intensity is greater when in brake lamp mode than when in tail lamp mode due to a resistor.

36. An LED light bulb as in claim 27 wherein the at least one light emitting diode's intensity is greater when in brake lamp mode than when in tail lamp mode due to a resistor electrically connected between the first contact and the printed circuit board and a resistor-diode series combination electrically connected between the second contact and printed circuit board.

37. An LED light bulb as in claim 27 wherein the bulb is shaped to fit into recessed sockets in automobiles.

* * * * *